(12) United States Patent
Shirakawa

(10) Patent No.: US 10,306,554 B2
(45) Date of Patent: May 28, 2019

(54) COMMUNICATION APPARATUS, CONTROL METHOD FOR COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Yusuke Shirakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/598,731

(22) Filed: May 18, 2017

(65) Prior Publication Data

US 2017/0353922 A1     Dec. 7, 2017

(30) Foreign Application Priority Data

Jun. 1, 2016  (JP) ................................ 2016-110220

(51) Int. Cl.
| | | |
|---|---|---|
| *G08C 17/00* | (2006.01) | |
| *H04W 52/02* | (2009.01) | |
| *H04W 68/00* | (2009.01) | |
| *H04W 4/80* | (2018.01) | |
| *H04W 76/30* | (2018.01) | |
| *H04W 76/14* | (2018.01) | |

(52) U.S. Cl.
CPC ......... *H04W 52/0209* (2013.01); *H04W 4/80* (2018.02); *H04W 68/005* (2013.01); *H04W 76/14* (2018.02); *H04W 76/30* (2018.02); *Y02D 70/00* (2018.01); *Y02D 70/142* (2018.01); *Y02D 70/144* (2018.01); *Y02D 70/162* (2018.01)

(58) Field of Classification Search
CPC . H04W 52/0209; H04W 76/14; H04W 76/30; H04W 68/005; H04W 4/80
USPC ........................................................ 370/311
See application file for complete search history.

(56) References Cited

U.S. PATENT DOCUMENTS

| | | | |
|---|---|---|---|
| 8,933,984 B2 * | 1/2015 | Ichieda ................ | H04N 9/3197 348/14.01 |
| 9,432,644 B2 * | 8/2016 | Ichieda ................ | H04N 9/3197 |
| 2008/0074560 A1 * | 3/2008 | Ichieda ................ | H04N 9/3147 348/739 |

(Continued)

FOREIGN PATENT DOCUMENTS

JP          2002-281128 A          9/2002

*Primary Examiner* — Chuong T Ho
(74) *Attorney, Agent, or Firm* — Cowan, Liebowitz & Latman, P.C.

(57) ABSTRACT

A communication apparatus that causes an external apparatus to operate through a remote control, the communication apparatus comprising a communication unit configured to wirelessly communicate with the external apparatus, and an instruction accepting unit configured to accept an instruction of an operation for the external apparatus to execute, wherein the communication unit establishes a wireless connection with the external apparatus upon the instruction accepting unit accepting the instruction, and transmits an operation command corresponding to the instruction to the external apparatus and disconnects the wireless connection with the external apparatus upon the external apparatus executing part of a series of operations corresponding to the operation command, without waiting for the remaining operations to be executed.

17 Claims, 14 Drawing Sheets

(56) References Cited

U.S. PATENT DOCUMENTS

| | | | | |
|---|---|---|---|---|
| 2010/0027414 | A1* | 2/2010 | Hamachi | H04W 48/16 |
| | | | | 370/216 |
| 2012/0214413 | A1* | 8/2012 | Rose | H04L 63/18 |
| | | | | 455/41.1 |
| 2013/0021223 | A1* | 1/2013 | Ichieda | H04N 9/3147 |
| | | | | 345/2.3 |
| 2014/0104443 | A1* | 4/2014 | Takahashi | H04N 1/00347 |
| | | | | 348/207.1 |
| 2015/0084839 | A1* | 3/2015 | Ichieda | H04N 9/3147 |
| | | | | 345/2.3 |
| 2016/0139720 | A1* | 5/2016 | Kritt | G06F 3/0416 |
| | | | | 345/173 |
| 2016/0301791 | A1* | 10/2016 | Kim | H04M 1/7253 |

* cited by examiner

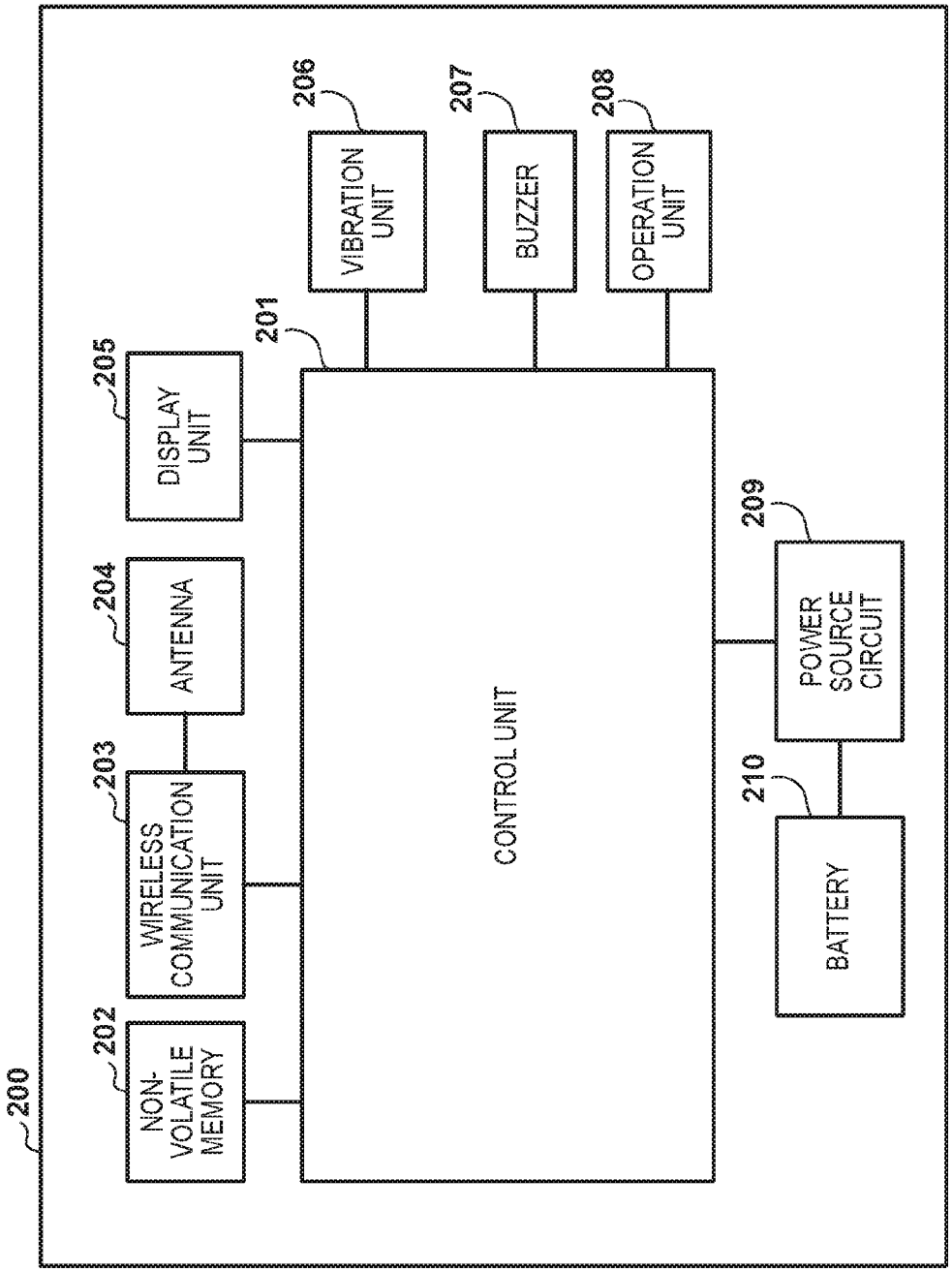

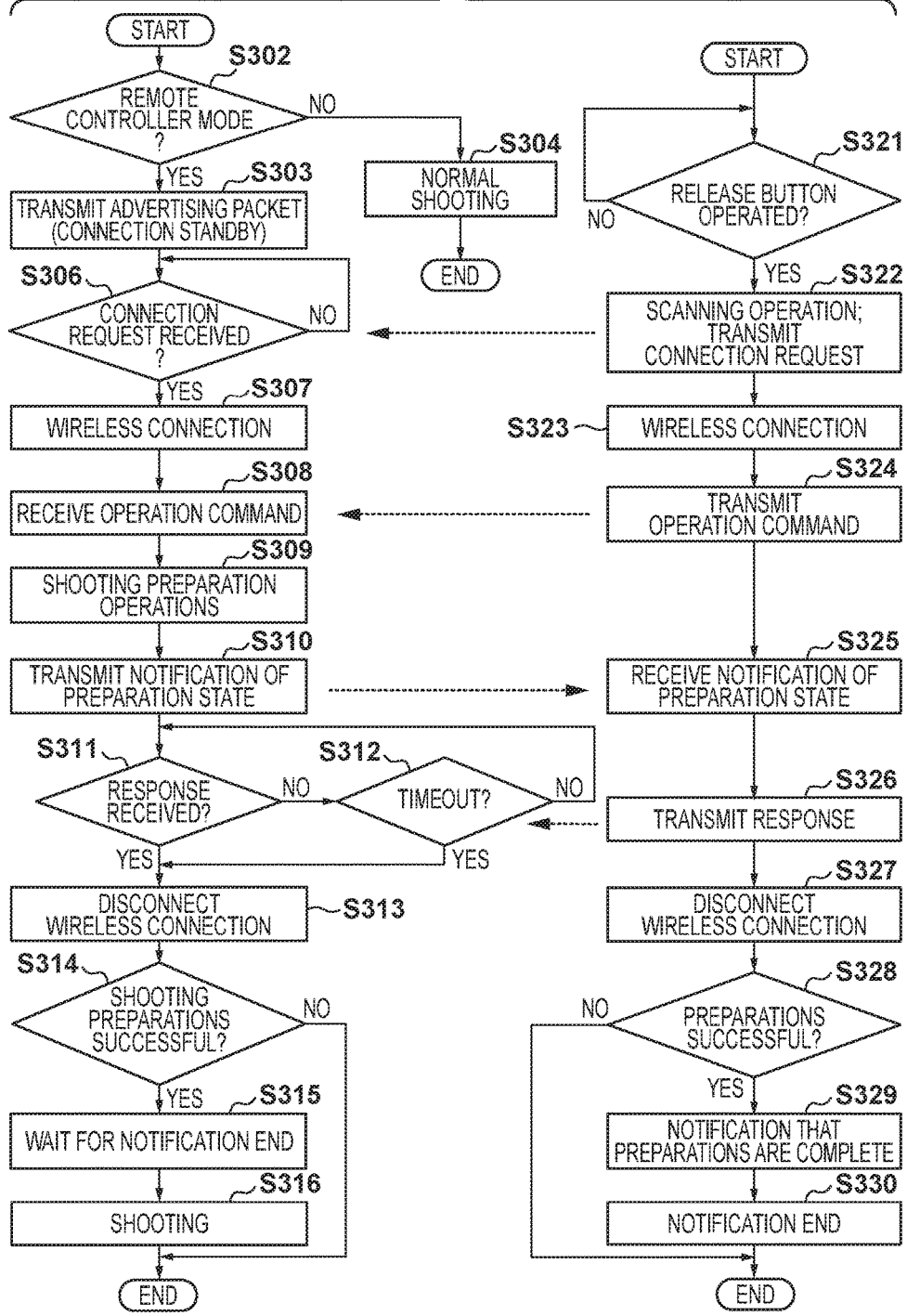

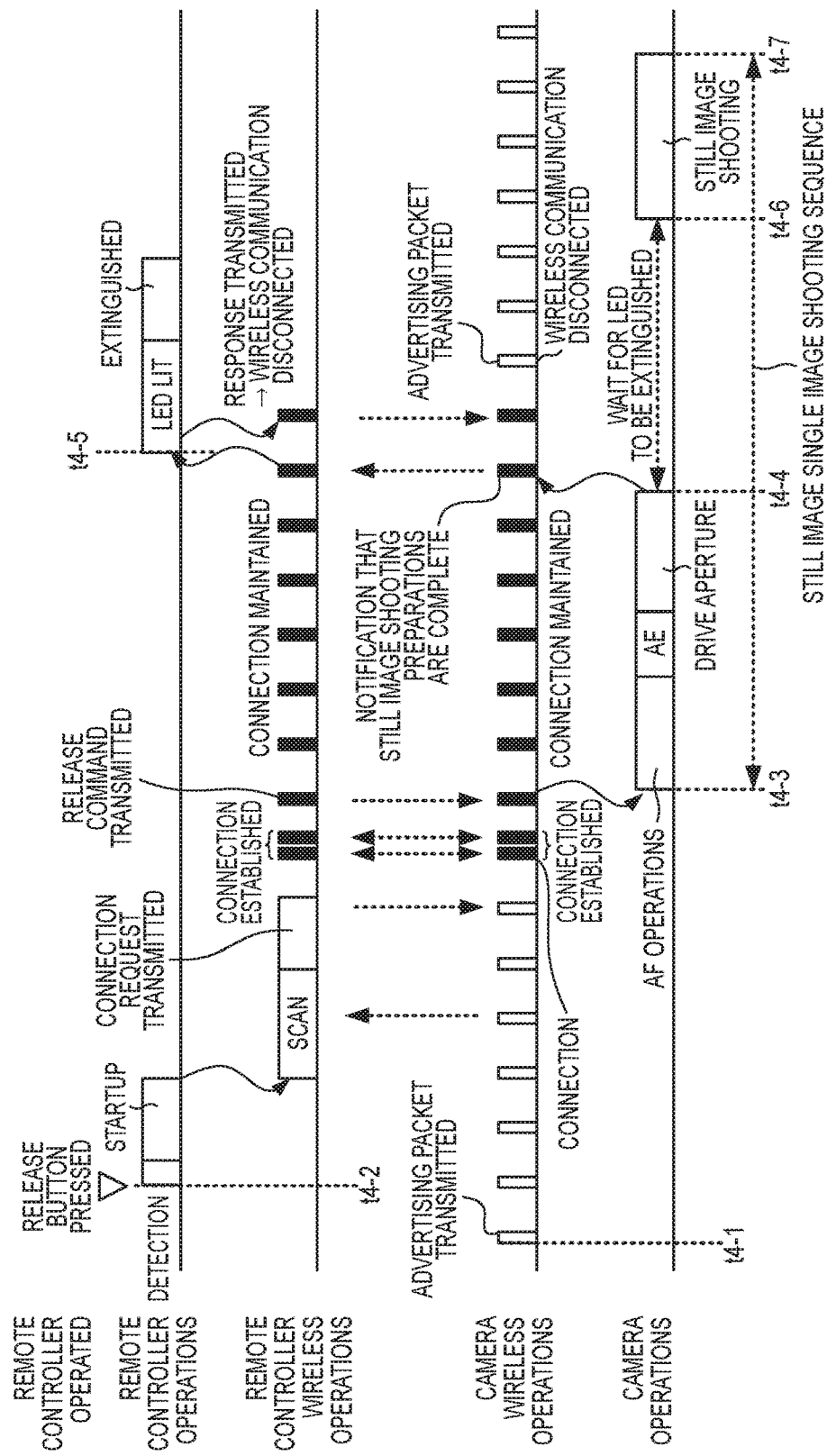

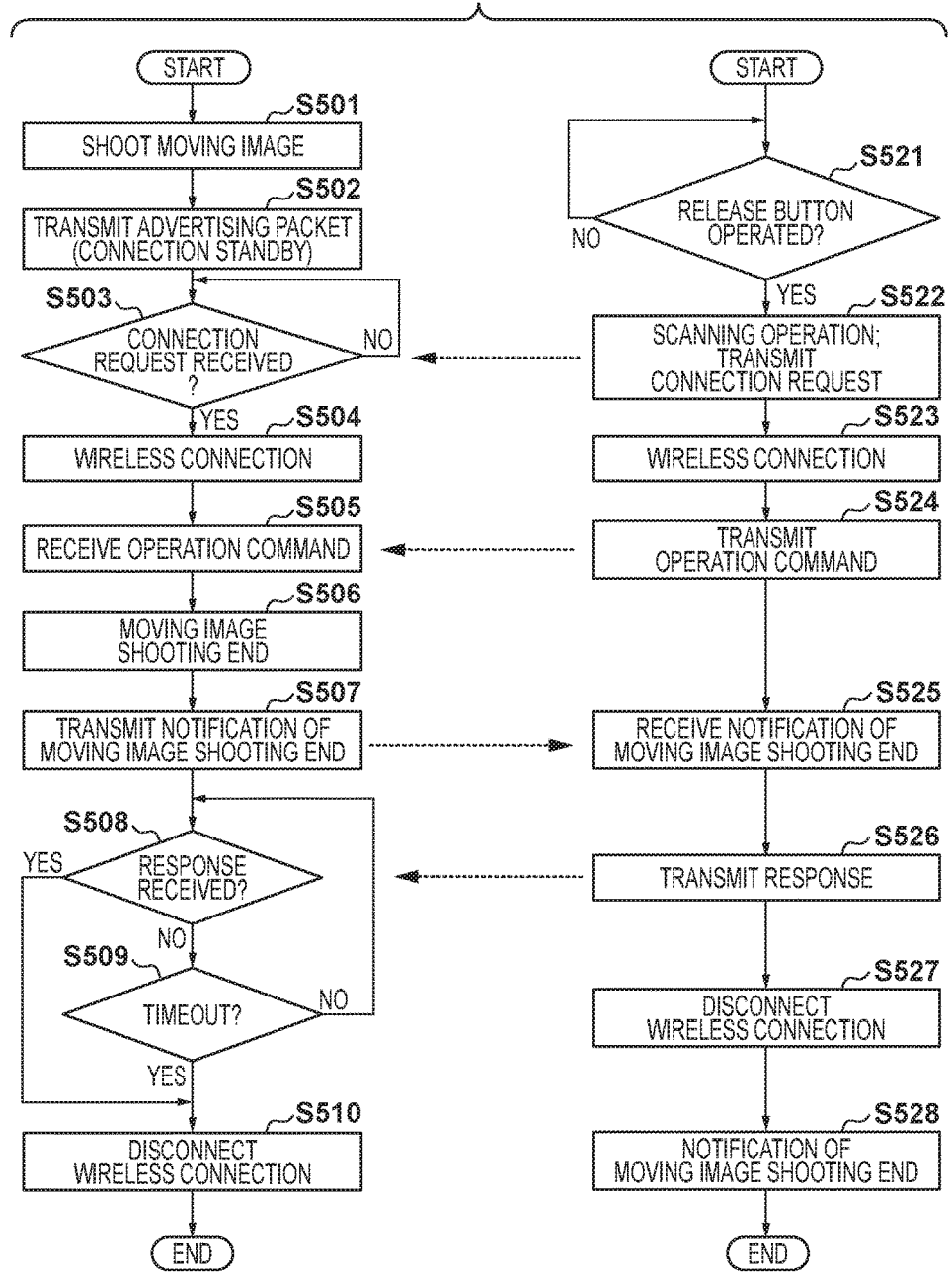

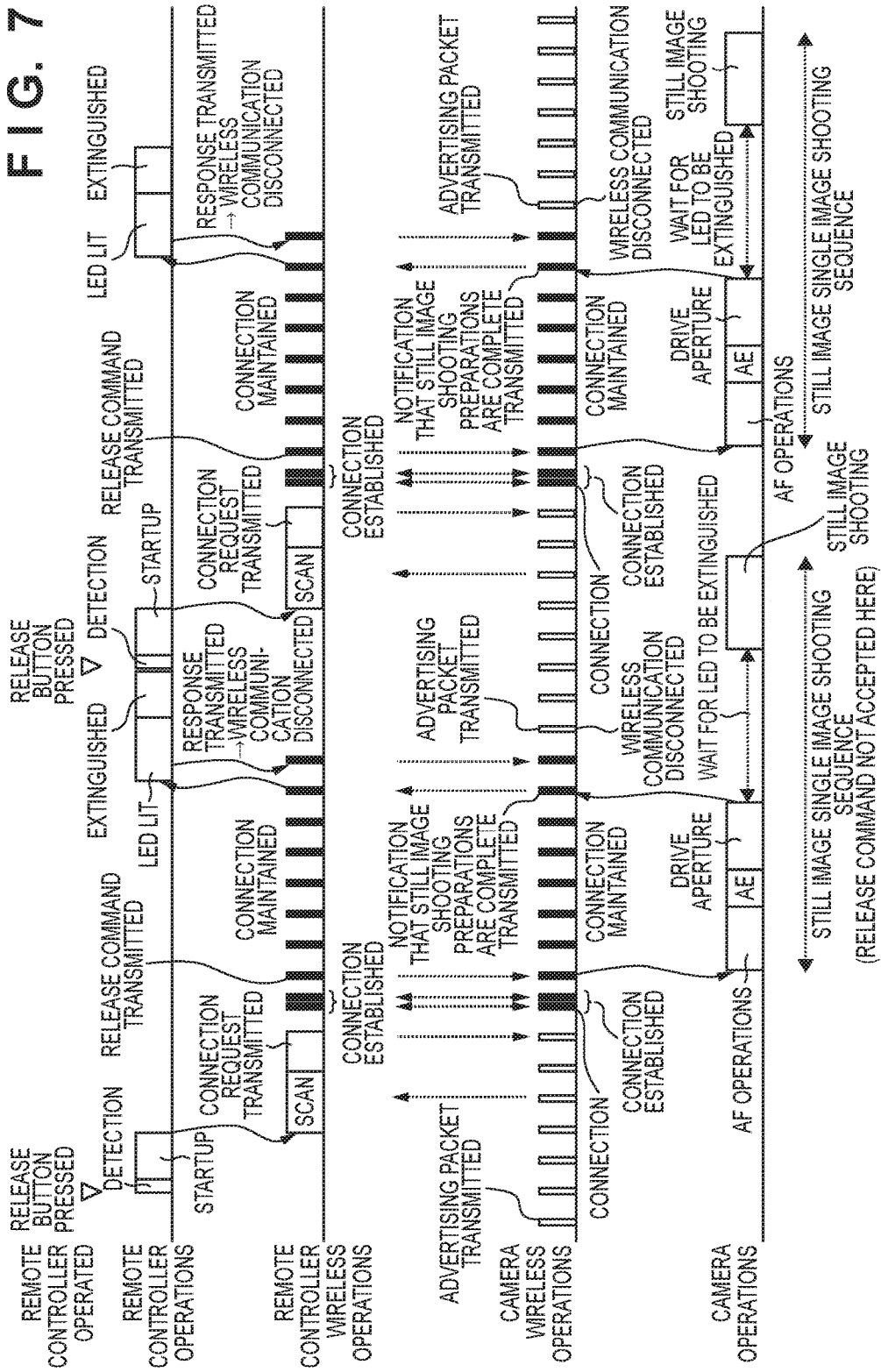

COMMUNICATION APPARATUS, CONTROL METHOD FOR COMMUNICATION APPARATUS, AND NON-TRANSITORY COMPUTER-READABLE STORAGE MEDIUM

BACKGROUND OF THE INVENTION

Field of the Invention

The invention relates to a communication apparatus, a control method for a communication apparatus, and a non-transitory computer-readable storage medium.

Description of the Related Art

Some communication apparatuses that remotely control the operation of a terminal, also known as "remote controllers", use infrared light. Infrared communication apparatuses have advantages, such as being cheap, but also have disadvantages, such as being limited to one-way communication, having high directionality that limits the direction of communication, and having short communication ranges.

As such, recent years have seen the spread of wireless communication apparatuses that use radio waves, such as Wi-Fi (trade name), Zigbee (trade name), and Bluetooth (trade name). Such wireless communication apparatuses have advantages that infrared systems cannot provide, such as two-way communication and omni-directionality. However, such wireless communication apparatuses also consume more power than infrared systems, and thus have a problem of poor battery life.

In response to this, a variety of methods for suppressing the amount of power consumed, notifying a user of the state of a battery in an easy-to-understand manner, and so on have been proposed for wireless communication devices. Japanese Patent Laid-Open No. 2002-281128 proposes a method for a mobile terminal that prevents a video call from being cut off by continually adding an indicator of the remaining battery level of the mobile terminal itself to the transmitted image while transmitting the image to the video call partner.

However, although the above-described proposed method does make it easier to understand the partner's situation and improves the operability, the method also continually transmits images, which uses a large amount of bandwidth. This method is therefore not suited to communication apparatuses that have low-capacity batteries.

SUMMARY OF THE INVENTION

Accordingly, the invention provides a technique for achieving both improved operability and reduced power consumption in a communication apparatus.

One aspect of embodiments of inventions relates to a communication apparatus that causes an external apparatus to operate through a remote control, the communication apparatus comprising, a communication unit configured to wirelessly communicate with the external apparatus, and an instruction accepting unit configured to accept an instruction of an operation for the external apparatus to execute, wherein the communication unit, establishes a wireless connection with the external apparatus upon the instruction accepting unit accepting the instruction, and transmits an operation command corresponding to the instruction to the external apparatus and disconnects the wireless connection with the external apparatus upon the external apparatus executing part of a series of operations corresponding to the operation command, without waiting for the remaining operations to be executed.

Further features of the invention will become apparent from the following description of exemplary embodiments (with reference to the attached drawings).

BRIEF DESCRIPTION OF THE DRAWINGS

FIG. 1B is a block diagram illustrating an example of the functional configuration of a communication apparatus according to embodiments of the invention.

FIG. 3 is a flowchart illustrating an example of processing according to embodiments of the invention.

FIGS. 4A and 4B are operation sequence charts according to a first embodiment of the invention.

FIG. 5 is a flowchart illustrating an example of processing according to a second embodiment of the invention.

FIG. 7 is an operation sequence chart according to a third embodiment of the invention.

DESCRIPTION OF THE EMBODIMENTS

Embodiments of the invention will be described in detail hereinafter based on the appended drawings. However, the embodiments described below are merely examples of modes for carrying out the invention, and various modifications and changes may be made as appropriate to the configurations of the apparatuses to which the invention is applied, the various conditions described, and so on. Multiple embodiments can also be combined as appropriate.

Configuration of Image Capturing Apparatus 100

Figure 1A:
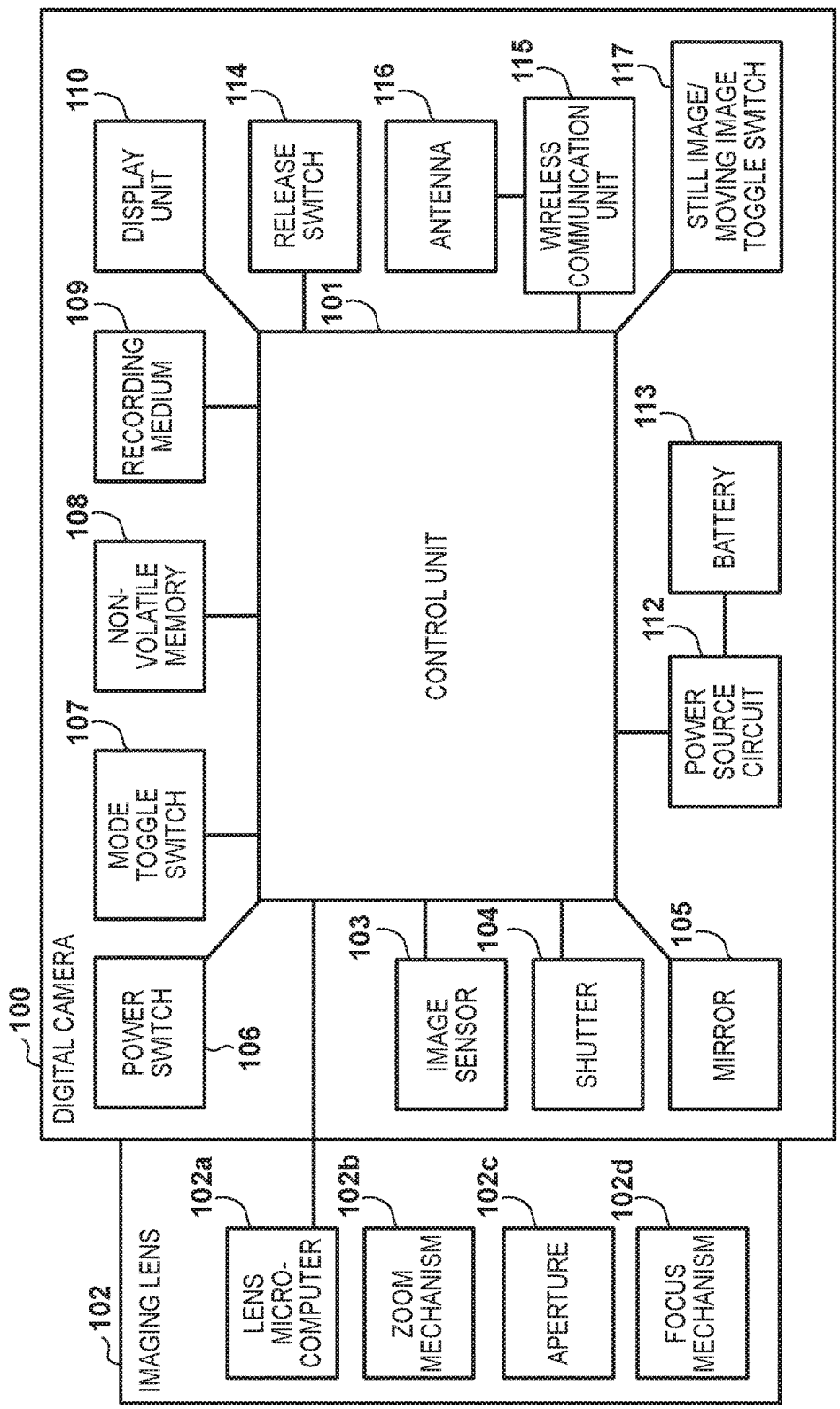
FIG. 1A is a block diagram illustrating an example of the functional configuration of an image capturing apparatus according to embodiments of the invention.

FIGS. 1A and 1B illustrate an example of the functional configurations of an image capturing apparatus and a communication apparatus according to embodiments of the invention. FIG. 1A is a block diagram illustrating an example of the configuration of a digital camera serving as an image capturing apparatus 100 according to the present embodiment.

Although the image capturing apparatus 100 will be described in the following embodiments using a digital camera as an example, the image capturing apparatus 100 is not limited to being embodied as a digital camera. The image capturing apparatus 100 can be any information processing apparatus, image capturing apparatus, information generating apparatus, or data generating apparatus having an image capturing function or an audio recording function, such as a personal computer, a cellular phone, a smartphone, a PDA, a tablet device, a digital video camera, or a portable media player. The configuration of the image capturing apparatus 100 will be described in detail hereinafter with reference to FIG. 1A.

A control unit 101 controls the various elements of the digital camera 100 (that is, the image capturing apparatus 100) in accordance with input signals, programs that will be described later, and the like. However, rather than being controlled by the control unit 101, the overall apparatus may be controlled by assigning different processes to multiple pieces of hardware.

An imaging lens 102 includes a lens microcomputer 102a, a zoom mechanism 102b, an aperture 102c, and a focus mechanism 102d, and is therefore configured as an optical system that controls an optical lens unit, an aperture, zooming, focusing, and the like. An image sensor 103 is constituted of an image sensor and the like for converting light introduced through the optical lens unit (an image) into an electrical image signal. A Complementary Metal Oxide Semiconductor (CMOS) or a Charge Coupled Device (CCD) is typically used as the image sensor. The image sensor 103 photoelectrically converts a subject image formed on an imaging surface via a mirror 105 when a shutter 104 is open, and then outputs a resulting analog image signal to the control unit 101.

The control unit 101 converts the analog image signal output from the image sensor 103 into a digital image signal (image data), carries out processes such as noise reduction, and then generates digital data as the image data. The series of processes for capturing and outputting the image data is referred to as "shooting" in the present embodiment. The digital camera 100 according to the present embodiment records the image data into a recording medium 109 according to the Design Rule for Camera. File System (DCF) standard.

A power switch 106 is an operating member through which a user turns the apparatus power on and off. A mode toggle switch 107 is an operating member for switching between a mode in which remote control of the digital camera 100 by a communication apparatus 200 illustrated in FIG. 1B are active, and a mode in which such remote control is inactive. A non-volatile memory 108 is a non-volatile memory that can be electrically erased and recorded to, and stores programs and the like (described later) executed by the control unit 101. The recording medium 109 can record the image data output from the control unit 101. The recording medium 109 may be configured to be removable from the digital camera 100, or may be built into the digital camera 100. That is to say, it is sufficient for the digital camera 100 to have some means of accessing the recording medium 109.

A display unit 110 displays a viewfinder image during shooting, image data that has been shot, text used for interactive operations, and so on. The display unit 110 need not be built into the digital camera 100, and may instead be configured to be connected to the digital camera 100. That is to say, it is sufficient for the digital camera 100 to be capable of connecting to an internal or external display unit 110 and have a display control function for controlling the display in the display unit 110. A power source circuit 112 supplies power stored in a battery 113 to the various blocks in the digital camera 100. The battery 113 is a rechargeable type such as a lithium-ion battery, and is configured to be removable from the digital camera 100.

A release switch 114 is an operating member through which the user instructs an image to be shot, and includes switches SW1 and SW2. When the release switch 114 is depressed halfway, the switch SW1 turns on. In response, the control unit 101 accepts an instruction to carry out shooting preparations including autofocus (AF) processing, automatic exposure (AE) processing, auto white balance (AWB) processing, flash pre-emission (EF) processing, and so on. When the release switch 114 is fully depressed, the switch SW2 turns on. An instruction for shooting is accepted as a result.

A wireless communication unit 115 is constituted of, for example, a modulation/demodulation circuit for processing a wireless signal, a communication controller, and so on. The wireless communication unit 115 wirelessly communicates with the communication apparatus 200 in accordance with the IEEE 802.15 standard. (also known as Bluetooth (trade name)) by outputting modulated wireless signals from an antenna 116 and demodulating wireless signals received through the antenna 116. In the present embodiment, the Bluetooth (trade name) communication uses Bluetooth (trade name) Low Energy (abbreviated as "BLE" hereinafter) version 4.0, which is low-power consumption communication. BLE has a shorter communication range and slower communication speeds than wireless LAN communication. BLE consumes less power than wireless LAN communication, however. Meanwhile, BLE has slower communication speeds than Bluetooth 3.0. However, BLE consumes less power than Bluetooth 3.0 as well. The wireless communication unit 115 may be constituted of a wireless communication interface based on the IEEE 802.11, Zigbee, or similar standard instead.

A still image/moving image toggle switch 117 is a switch for toggling between whether remote control from the communication apparatus 200 cause a still image or a moving image to be shot in the case where the still image/moving image toggle switch 117 is set to still image shooting, the image capturing apparatus 100 will shoot a still image in response to a shooting operation being instructed through a remote control from the communication apparatus 200. In the case where the still image/moving image toggle switch 117 is set to moving image shooting, the image capturing apparatus 100 will shoot a moving image in response to a shooting operation being instructed through a remote control from the communication apparatus 200. The still image shooting may be additionally provided with the ability to switch between a single shooting mode, in which one still image is shot at a time, and a continuous shooting mode, in which multiple still images are shot quickly in sequence.

Configuration of Communication Apparatus 200

Next, an example will be given of the configuration of an information processing apparatus serving as the communication apparatus 200 that remotely operates the image capturing apparatus 100. FIG. 1B is a block diagram illustrating an example of the configuration of a remote control apparatus serving as an example of the communication apparatus 200 according to the present embodiment. Although a remote control apparatus wall be described as an example of the communication apparatus 200 in the following embodiments, the communication apparatus 200 is not limited to being embodied as a remote control apparatus. The communication apparatus 200 can be any information processing apparatus, such as a digital camera, a smartphone, a FDA, a tablet device, a digital video camera, or a portable media player. The configuration of the communication apparatus 200 will be described in detail hereinafter with reference to FIG. 1B.

A control unit 201 controls the various elements of the communication apparatus 200 in accordance with input signals, programs that will be described later, and the like. However, rather than being controlled by the control unit 201, the overall apparatus may be controlled by assigning different processes to multiple pieces of hardware. A non-volatile memory 202 is a non-volatile memory that can be electrically erased and recorded to. An operating system (OS), which is basic software executed by the control unit 201, as well as applications that implement applicable functions by running in tandem with the OS, are recorded in the non-volatile memory 202. In the present embodiment, the non-volatile memory 202 also stores software for communicating with the digital camera 100.

A wireless communication unit 203 facilitates wireless communication with another apparatus, such as the image capturing apparatus 100. The wireless communication unit 203 is constituted of a modulation/demodulation circuit for processing a wireless signal, a communication controller, and so on. The wireless communication unit 203 can wirelessly communicate with an external apparatus, namely the image capturing apparatus 100, in accordance with the above-described BLE version 4.0 by outputting modulated wireless signals from an antenna 204 and demodulating wireless signals received through the antenna 204. The wireless communication unit 203 may be constituted of a wireless communication interface based on the IEEE 802.11, Zigbee, or similar standard instead. Furthermore, although FIG. 1B illustrates a configuration in which the control unit 201 and the wireless communication unit 203 are separate units, these units may instead be configured as a single integrated unit.

A display unit 205 is constituted of one or more LEDs, and can notify a user of the type of a button that has been pressed, operating states of the image capturing apparatus 100 and the communication apparatus 200, and so on through a color display. A vibration unit 206 communicates information to the user through vibration, by producing vibration patterns corresponding to operations made by the user, vibration patterns expressing operating states, and so on. A buzzer 207 communicates information to the user through audio, by producing audio patterns corresponding to operations made by the user, audio patterns expressing operating states, and so on. An operation unit 208 is constituted of operating buttons serving as instruction accepting members for accepting the input of instructions (operation input) for remotely controlling the image capturing apparatus 100. These operating buttons include a release button, an autofocus button, and a zoom (wide/tele) button, for example.

In the present embodiment, the display unit 205 and the operation unit 208 may be constituted of separate units as described above, or may be configured integrally, as a touch panel display, for example. In the case of a touch panel display, items corresponding to the buttons and LEDs are displayed in a liquid crystal display unit, and operations made on those buttons can be detected as operations made by the user's finger by a touch sensor formed on the liquid crystal display unit.

A power source circuit 209 supplies power stored in a battery 210 to the various blocks in the communication apparatus 200. The battery 210 may be a nonrechargeable battery such as a button-type battery, or may be a rechargeable battery; the battery 210 may furthermore be provided so as to be removable from the communication apparatus 200.

System Configuration

Figure 2:
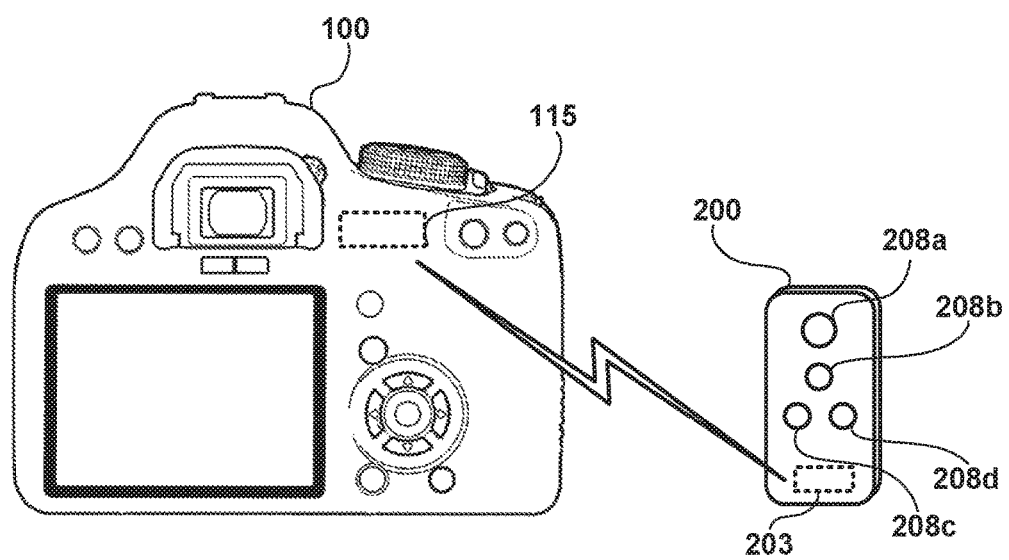
FIG. 2 is a diagram illustrating an example of a connection state between the image capturing apparatus and the communication apparatus according to embodiments of the invention.

Next, FIG. 2 is a diagram illustrating an example of a connection state between the image capturing apparatus 100 and the communication apparatus 200 according to embodiments of the invention. As illustrated in FIG. 2, the image capturing apparatus 100 and the communication apparatus 200 according to the present embodiment are wirelessly connected through a wireless communication system such as Bluetooth, BIB, Zigbee, or Wi-Fi. Compared to an infrared system, a wireless communication system has advantages, such as being capable of two-way communication, having low directionality and thus no limitations on operating positions, and a comparatively long communication range. Of these systems, BLE in particular consumes less power, and thus enables a communication apparatus to be used effectively even if the communication apparatus operates using a button-type battery.

As illustrated in FIG. 2, the operation unit 208 of the communication apparatus 200 can be configured including switches for controlling a camera, such as a release button 208a, an AF button 208b, and zoom buttons 208c and 208d. Each switch may be configured as a physical member that can be depressed by a user's finger. In the case where the buttons are displayed in a touch panel display, the touch panel display may be configured to be capable of detecting tapping and swiping operations made by the user's finger at the positions where the buttons are displayed. The control unit 201 controls the operations of the display unit 205, the vibration unit 206, and the buzzer 207 in accordance with operations made through the operation unit 208, and thus the user operating the communication apparatus 200 can be notified of the operating state of the image capturing apparatus 100 in detail. In other words, even when the user is operating the communication apparatus 200 at a location distanced from the image capturing apparatus 100, the user can confirm the state of the image capturing apparatus 100, such as whether or not shooting was successful, that autofocus (AF) has focused, and whether or not the zoom has been successfully changed, on the basis of LED displays, vibrations, audio, and the like.

It is necessary to pair the image capturing apparatus 100 with the communication apparatus 200 in advance in order for the apparatus to be capable of communicating as illustrated in FIG. 2. This is because it is necessary to register the image capturing apparatus 100 and the communication apparatus 200 with each other in order for those apparatuses to recognize each other as communication partners and avoid erroneous operations in environments where other devices are also present. Furthermore, according to the present embodiment, the image capturing apparatus 100 is put into a state where remote control can be accepted by the user operating the mode toggle switch 107 and activating remote control. Additionally, the shooting mode that is to be remotely controlled can be selected using the still image/moving image toggle switch 117.

In this manner, using a wireless communication system such as BLE makes it possible to provide a high level of operability when remotely controlling the image capturing apparatus 100 from the communication apparatus 200. However, in the case where the battery of the communication apparatus 200 is a low-capacity battery such as a button-type battery, it is furthermore necessary to operate the communication apparatus 200 as described hereinafter in order to achieve such operability while ensuring the battery will last for a long period of time. Specific embodiments of the invention will be described next.

First Embodiment

Figure 4B:
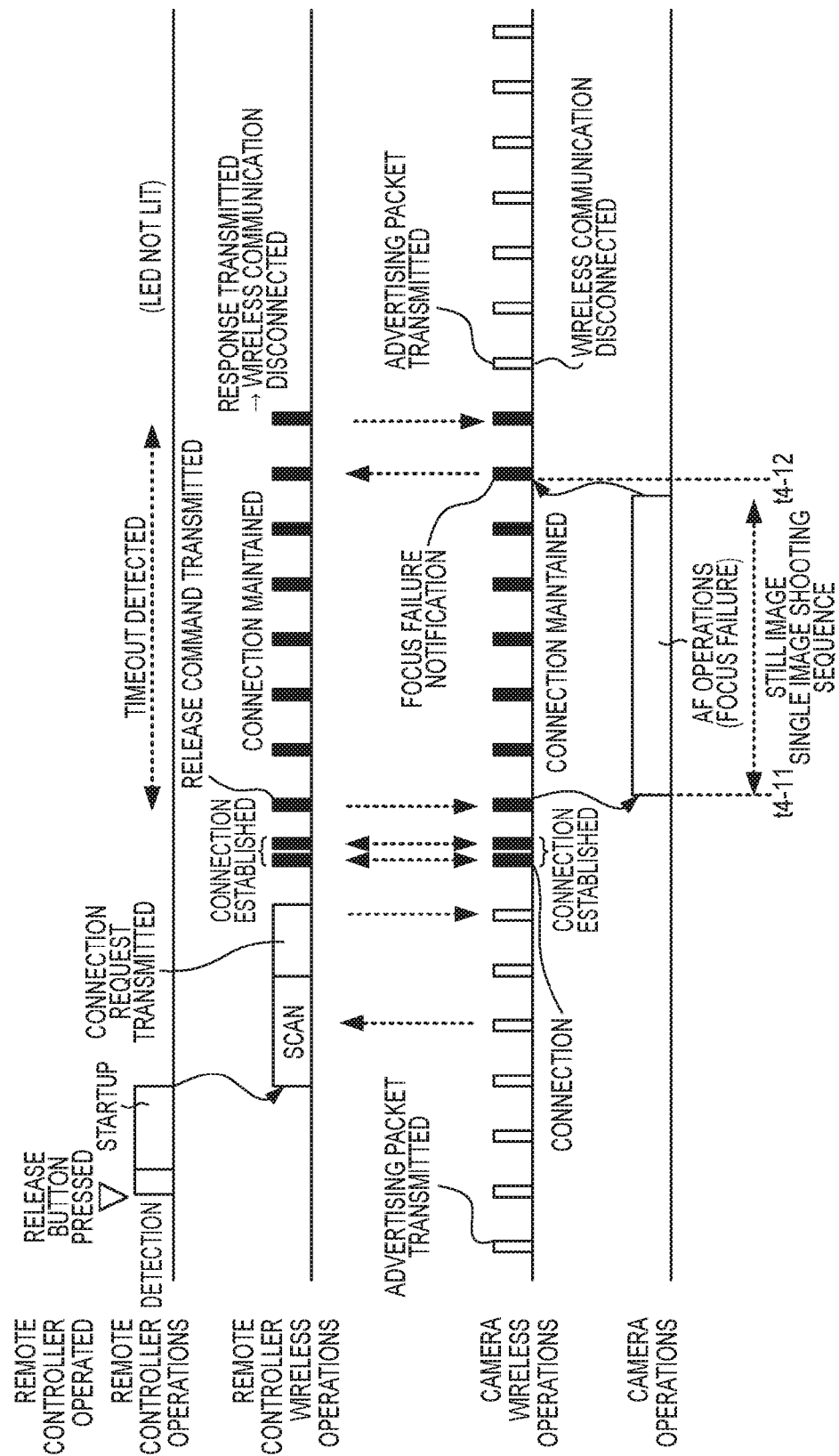

Operations according to a first embodiment of the invention will be described hereinafter with reference to FIGS. 3, 4A, and 4B. The present embodiment describes a case where the image capturing apparatus 100 shoots a single still image by being remotely controlled from the communication apparatus 200. FIG. 3 is a flowchart illustrating an example of operations carried out by the image capturing apparatus 100 and the communication apparatus 200 in the case where a single still image is shot in response to remote control from the communication apparatus 200. The processing illustrated in this flowchart is realized by the control unit 101 of the image capturing apparatus 100 controlling the various elements of the image capturing apparatus 100 according to signals received from the wireless communication unit 115, programs stored in the non-volatile memory 108, and the like. The processing illustrated in the flowchart is also realized by the control unit 201 of the communication apparatus 200 controlling the various elements of the communication apparatus 200 according to signals received from the wireless communication unit 203, operation inputs accepted to the operation unit 208, programs stored in the non-volatile memory 202, and the like. The same applies to the flowcharts described in the other embodiments as well. FIGS. 4A and 4B, meanwhile, are sequence charts corresponding to FIG. 3, and illustrate operations of the various parts in time series from left to right. For the sake of simplicity, the image capturing apparatus 100 is denoted as a "camera" and the communication apparatus 200 is denoted as "remote controller" in the sequence charts illustrated in FIGS. 4A and 4B. The same applies to the other sequence charts described in the other embodiments as well.

The flowchart illustrated in FIG. 3 is started in response to the power switch 106 of the image capturing apparatus 100 being turned on. First, in S302, the control unit 101 determines whether or not the mode toggle switch 107 is set to a mode in which remote control is active (a "remote controller acceptance mode"). The process moves to S303 in the case where the control unit 101 has determined that the mode toggle switch 107 is set to the remote controller acceptance mode. Although not illustrated in FIG. 3, it is assumed that at this time, the control unit 101 also confirms that the still image/moving image toggle switch 117 is set to a still image mode. On the other hand, the process moves to S304 in the case where the control unit 101 has determined that the mode toggle switch 107 is not set to the remote controller acceptance mode. In S304, shooting is carried out in response to an operation made directly through the image capturing apparatus 100 (normal shooting) rather than a remote control from the communication apparatus 200, and the processing then ends.

Upon determining that the remote controller acceptance mode is set, in S303, the control unit 101 controls the wireless communication unit 115 to start transmitting advertising packets. "Transmitting advertising packets" refers to a connection standby operation, in which packets containing connection information are broadcast to numerous unspecified devices and a connection partner device (the communication apparatus 200, in the present embodiment) receives those packets to establish the connection. The sequence chart illustrated in FIG. 4A starts from this state, with an advertising packet being transmitted regularly every set amount of time (periodically) starting from time t4-1 in the "camera wireless operations" line.

In the case where the image capturing apparatus 100 is transmitting advertising packets, and the control unit 201 of the communication apparatus 200 detects that the release button 208a of the operation unit 208 has been operated in S321, the process moves to S322. In S322, the control unit 201 controls the wireless communication unit 203 to carry out a scanning operation for detecting the advertising packets. Upon detecting an advertising packet, the control unit 201 controls the wireless communication unit 203 to transmit a wireless connection request, for transitioning to a wirelessly-connected state, to the image capturing apparatus 100, after which the process moves to S323.

On the image capturing apparatus 100 side, in S306, the control unit 101 detects that the wireless connection request transmitted by the communication apparatus 200 has been received by the wireless communication unit 115, and the process moves to S307. In S307 and S323, the control unit 101 of the image capturing apparatus 100 controls the wireless communication unit 115 and the control unit 201 of the communication apparatus 200 controls the wireless communication unit 203 in order to establish a wireless connection between the two apparatuses.

A sequence involved in the wireless connection operations will be described now with reference to FIG. 4A. When not being operated by a user, the communication apparatus 200 is in a standby state, in which the control unit 201 is in a sleep state in order to reduce power consumption and the communication apparatus 200 is standing by for a signal change resulting from the operation unit 208 being operated. The control unit 201 executes a startup sequence in response to the release button 208a being depressed at time t4-2. Specifically, the control unit 201 issues an interrupt upon detecting a signal change, loads a processing program from the non-volatile memory 202, and executes the program. Upon starting up, the control unit 201 controls the wireless communication unit 203 to start wireless operations, namely the scanning operation for receiving the advertising packets transmitted from the image capturing apparatus 100. Upon the wireless communication unit 203 receiving the advertising packet through the scanning operation, the control unit 201 controls the wireless communication unit 203 to transmit the wireless connection request to the image capturing apparatus 100. This wireless connection request includes identification information of the communication apparatus 200.

On the image capturing apparatus 100 side, in the case where the control unit 101 has determined that the identification information matches identification information registered in advance through the pairing process, the control unit 101 recognizes the communication apparatus 200 as a connection partner and controls the wireless communication unit 115 to establish a wireless connection. After the wireless connection is established between the image capturing apparatus 100 and the communication apparatus 200, the image capturing apparatus 100 and the communication apparatus 200 are connected one-to-one, and transmit/receive information periodically at corresponding timings. In the "camera wireless operations" line in FIG. 4A, the white rectangles indicate the transmission of advertising packets, whereas the black rectangles indicate communication (connections) after the connection has been established.

Once the wireless connection is established between the image capturing apparatus 100 and the communication apparatus 200, in S324, the control unit 201 of the communication apparatus 200 controls the wireless communication unit 203 to transmit an operation command to the image capturing apparatus 100. This "operation command" includes an operation command based on the release button 208a being operated, as detected in S321. In S308, the control unit 101 of the image capturing apparatus 100 detects that the wireless communication unit 115 has received the operation command transmitted from the communication apparatus 200. Here, the shooting mode of the image capturing apparatus 100 is set to the still image mode, and thus the control unit 101 recognizes the received operation command to be a still image shooting command. The control unit 101 starts a still image shooting sequence, executing, in S309, shooting preparation operations such as an autofocus (AF) process, an automatic exposure (AE)

process, and auto white balance (AWB) process, flash pre-emission (EF), an aperture driving operation, pre-exposure preparation operations for the image sensor, and so on.

In the case where the image capturing apparatus 100 is operated directly, the switch SW1 turns on, and the shooting preparation operations are executed, when the release switch 114 is depressed halfway; the switch SW2 turns on and an image is shot when the release switch 114 is then depressed fully. However, in the case where the image capturing apparatus 100 is controlled remotely using the communication apparatus 200, the image capturing apparatus 100 executes operations corresponding to the switches SW1 and SW2 being operated successively in response to the release button 208a being operated a single time. In other words, upon receiving the operation command based on the release button 208a from the communication apparatus 200, the image capturing apparatus 100 executes the shooting preparation operations, and then executes the operations up to and including the shooting of the still image successively, without being further notified by the communication apparatus 200 that the release button 208a has been operated.

Referring to FIG. 4A, the operations of the image capturing apparatus 100 spanning from the start of AF operations at time t4-3 to the completion of still image shooting at time t4-7 correspond to a still image single shooting sequence. In the present embodiment, the "still image single shooting sequence" is defined as a series of operations spanning from when the image sensor is exposed to light from a subject to when post-exposure readout is complete. In this shooting sequence, preparation for image sensor exposure is considered complete, and shooting preparations are considered complete, when AF/AE operations, aperture driving operations, and so on are complete. In the present embodiment, when shooting preparations are complete, the image capturing apparatus 100 notifies the communication apparatus 200 that still image shooting preparations are complete. In response to this, the communication apparatus 200 disconnects wireless communication, and lights/extinguishes an LED at time t4-5. "Lights/extinguishes an LED" is mentioned here as an example, but the notification may be made using audio or vibration as will be described later. This applies to the other embodiments as well. Upon extinguishing the LED, the communication apparatus 200 enters the sleep state, which suppresses the consumption of the battery to the greatest extent possible, in the same manner as in the initial state illustrated in FIG. 4A. Once the still image shooting is complete at time t4-7, the image capturing apparatus 100 also returns to the initial state illustrated in FIG. 4A, namely transmitting advertising packets and standing by for a remote controller connection.

As illustrated in FIG. 4A, when the image capturing apparatus 100 receives an operation command (release command) from the communication apparatus 200 after the connection has been established, the still image single shooting sequence is started at time t4-3. This sequence starts from the AF operations. The AF operations are completed by detecting the distance to a subject using a contrast detection system, a phase difference detection system, or the like, and then driving the lens to an in-focus position. However, the AF operations may fail in the case where the subject has a low contrast or is dark, or the case where the subject is closer to the lens than a minimum shooting distance. The AE operations that follow thereafter may also fail in the case where the subject is too bright or the brightness of the subject varies.

FIG. 4B is a sequence chart illustrating a case where the AF operations have failed. The still image single shooting sequence is started and AF operations are carried out at time t4-11. However, in the case were the AF operations have failed (the focusing has failed), the image capturing apparatus 100 transmits a focus failure notification to the communication apparatus 200 at time t4-12. In this case, the communication apparatus 200 immediately transmits a response to the notification and disconnects the wireless communication. The communication apparatus 200 also does not light the LED indicating the shooting preparations are complete. The user can recognize that the shooting preparations have failed and an image cannot be shot as a result. Although FIG. 4B illustrates a case where the AF operations have failed, a notification that the shooting preparations have failed is transmitted from the image capturing apparatus 100 to the communication apparatus 200 in the case where other shooting preparation operations, such as AE operations or aperture driving operations, have failed as well.

Returning to FIG. 3, when the series of shooting preparations are complete or have failed midway through, in S310, the control unit 101 of the image capturing apparatus 100 controls the wireless communication unit 115 to notify the communication apparatus 200 of the state of the shooting preparations. This notification includes information indicating that shooting preparations have been successful and are complete, or information indicating that some operation in the shooting preparation operations has failed. In S325, upon the control unit 201 of the communication apparatus 200 detecting that the wireless communication unit 203 has received the notification of the shooting preparation state, the process moves to S326. In S326, the control unit 201 controls the wireless communication unit 203 to transmit a response packet to the image capturing apparatus 100. The response packet includes a notification indicating that the wireless communication will be disconnected. The response packet can also include information of a time for which the communication apparatus 200 will continue to make the notification after the wireless communication is disconnected, for the case where the shooting preparations are successful on the image capturing apparatus 100 side. After the response has been transmitted, in S327, the control unit 201 controls the wireless communication unit 203 to disconnect the wireless communication.

At the point in time when the communication apparatus 200 disconnects the wireless communication in S327, at most, the shooting preparation operations have been completed on the image capturing apparatus 100 side. Shooting itself has not actually started. However, if the shooting preparations are complete in the image capturing apparatus 100, all that is left is for an image to actually be shot. Thus, the communication apparatus 200 disconnects the wireless communication in order to avoid wastefully consuming the battery by continuing the communication. In the case where the shooting preparations have failed too, continuing the wireless communication will only wastefully consume the battery, and thus the wireless communication is disconnected. However, the user can reestablish the connection and carry out operations again by executing the same operations again in the communication apparatus 200, and thus there is no problem whatsoever from the standpoint of operability for the user.

Next, in S328, the control unit 201 determines whether or not the shooting preparations have succeeded in the image capturing apparatus 100. In the case where the control unit 201 has determined that the shooting preparations have succeeded, the process moves to S329, where the user is notified. On the other hand, in the case where the control unit 201 has determined that the shooting preparations have failed, the process ends without notifying the user. In this case, the user can recognize that the shooting is not complete by the fact that a notification has not been made.

In S329, the control unit 201 controls the display unit 205 to light an LED, for example, to notify the user of the shooting preparations in the image capturing apparatus 100 being complete. Instead of lighting an LED, the user may be notified by, for example, controlling the vibration unit 206 to produce a predetermined vibration pattern, controlling the buzzer 207 to output predetermined audio, or the like. Once a predetermined amount of time has passed, in S330, the control unit 201 controls the display unit 205 or the like to end the notification. This ends the processing on the communication apparatus 200 side.

On the image capturing apparatus 100 side, in S311, the control unit 101 determines whether or not the wireless communication unit 115 has received a response from the communication apparatus 200. The process moves to S313 when the control unit 101 determines that a response has been received. The received response packet includes the notification that the wireless communication is to be disconnected, and thus in S313 the control unit 101 controls the wireless communication unit 115 to disconnect the wireless communication. On the other hand, when the control unit 101 determines that a response has not been received, the process moves to S312, where the control unit 101 determines whether or not a timeout has occurred. The process moves to S313 when the control unit 101 determines that a timeout has occurred. On the other hand, when the control unit 101 does not determine that a timeout has occurred, the process returns to S311, where the control unit 101 monitors whether or not a response has been received.

When the wireless communication is disconnected, the control unit 101 controls the wireless communication unit 115 to restart the transmission of advertising packets. Meanwhile, in S314, when the control unit 101 determines that the shooting preparations carried out in S309 have succeeded, the process moves to S315. However, when the control unit 101 determines that the shooting preparations have failed, the process ends without an image being shot. In S315, the control unit 101 stands by for the notification in the communication apparatus 200, indicating that the shooting preparations are complete, to end. Based on the response received in S311, it is known, on the image capturing apparatus 100 side, whether the notification that preparations are complete has been carried out in the communication apparatus 200 for a continuous amount of time. As such, a standby time can be set in accordance with that continuous amount of time after the response is received in S311. Next, in S316, the control unit 101 drives the shutter 104, the mirror 105, the image sensor 103, and so on to shoot a still image. By this time, it is certain that the notification on the communication apparatus 200 side has ended, and thus light from the LED will not appear in the shot image.

Although FIG. 3 only illustrates a case where the notification is received in S325, a case is also conceivable in which the shooting preparations take time on the image capturing apparatus 100 side and the notification of the preparation state cannot be received in a timely manner. This may be a case where the image capturing apparatus 100 cannot focus quickly and the AF operations continue for an extended period of time, for example. In such a case, the control unit 201 of the communication apparatus 200 may detect a timeout in S325. In the case where, after transmitting the operation command in S324, the control unit 201 cannot receive the notification of the preparation state from the image capturing apparatus 100 within a set amount of time, the process may move to S327 and the wireless communication may be disconnected. Doing so makes it possible to improve both the operability and the battery life even in the case where an image will not be shot.

According to the present embodiment as described thus far, a wireless connection can be established between the image capturing apparatus 100 and the communication apparatus 200 in response to an operation input made in the communication apparatus 200, and the operation command for shooting a still image can be transmitted from the communication apparatus 200 to the image capturing apparatus 100. After the sequence of operations for shooting the still image in response to the received operation command has been started, the image capturing apparatus 100 notifies the communication apparatus 200 that the shooting preparations are complete without waiting for the shooting to be completed, or that the shooting preparations have failed. In response to this notification, the communication apparatus 200 can disconnect the wireless communication with the image capturing apparatus 100 without waiting for the shooting to be completed. Then, in the case where the shooting preparations have succeeded on the image capturing apparatus 100 side, the user is notified that shooting can be carried out with the image capturing apparatus 100 after the communication has been disconnected. The user can therefore confirm whether or not the shooting will be carried out. Meanwhile, the still image is shot by the image capturing apparatus 100 after the notification made by the communication apparatus 200 has ended, and thus the notification made on the communication apparatus 200 side will not affect the shot still image, such as the LED display appearing in the still image, for example.

As a result, the shooting process can be executed with the communication apparatus 200 carrying out wireless communication with the image capturing apparatus 100 in arm efficient manner. It is thus unnecessary to carry out communication using a high amount of bandwidth, and thus the power consumed by the remote control can be reduced, while ensuring good operability, even when using a communication apparatus having a low-capacity battery.

Second Embodiment

Operations according to a second embodiment of the invention will be described hereinafter with reference to FIGS. 3, 5, and 6. The present embodiment describes a case where the image capturing apparatus 100 shoots a moving image by being remotely controlled from the communication apparatus 200. As a method for controlling the shooting of a moving image by the image capturing apparatus 100 through remote control made from the communication apparatus 200, the present embodiment will describe a case where an operating mode of the image capturing apparatus 100 is set to a moving image mode, moving image shooting is started in response to the release button 208a of the communication apparatus 200 being operated once, and moving image shooting is then ended in response to the release button 208a being operated once more. However, the method of operating the communication apparatus 200 is not limited thereto. For example, a dedicated moving image button may be used, or the shooting may be carried out only while a button is being held down.

Processing carried out when starting to shoot a moving image is executed in the same manner as illustrated in the flowchart of FIG. 3. Meanwhile, FIG. 5 is a flowchart illustrating an example of operations carried out by the image capturing apparatus 100 and the communication apparatus 200 in the case where moving image shooting operations carried out by the image capturing apparatus 100 are ended in response to remote control from the communication apparatus 200. FIG. 6 is a sequence chart corresponding to the flowcharts indicating the starting and ending of moving image shooting, and illustrates operations of the various parts in time series from left to right.

In the case where the control unit 101 controls the start of moving image shooting according to the flowchart illustrated in FIG. 3, it is assumed that the control unit 101 has confirmed the setting of the still image/moving image toggle switch 117 and determined that the switch is set to the moving image mode. Aside from this determination, the operations are almost identical to those carried out when shooting a single still image as described in the first embodiment.

Referring to FIG. 3, when the control unit 101 determines that the remote controller acceptance mode is set and confirms that the operating mode is the moving image mode in S302, the image capturing apparatus 100 transmits the advertising packets and enters the connection standby state in S303, in the same manner as in the first embodiment. The image capturing apparatus 100 and the communication apparatus 200 then establish a wireless connection in S307 and S323. After this, in S324, the control unit 201 controls the wireless communication unit 203 to transmit the operation command to the image capturing apparatus 100. This "operation command" indicates the release button 208a being operated, as detected in S321. In S308, the control unit 101 of the image capturing apparatus 100 detects that the wireless communication unit 115 has received the operation command transmitted from the communication apparatus 200. Here, the shooting mode of the image capturing apparatus 100 is set to the moving image mode, and thus the control unit 101 recognizes the received operation command to be a moving image shooting start command. Shooting preparation operations such as those carried out in the still image shooting mode are not carried out in the moving image mode. Thus, the control unit 101 skips the shooting preparation operations of S309, and the process moves to S310. In the case of controlling the start of moving image shooting, the image capturing apparatus 100 controls the image sensor 103, the shutter 104, and the mirror 105. However, the image capturing apparatus 100 does not carry out shooting preparation operations that are likely to fail, such as the AF/AE operations carried out when shooting a still image.

In S310, the control unit 101 of the image capturing apparatus 100 controls the wireless communication unit 115 to notify the communication apparatus 200 that the shooting preparations are complete. In this manner, when shooting a moving image, the image capturing apparatus 100 transmits the notification that shooting preparations are complete immediately upon receiving the operation command from the communication apparatus 200. In S325, the control unit 201 of the communication apparatus 200 detects that the wireless communication unit 203 has received the notification that the shooting preparations are complete, and the process then moves to S326. In S326, the control unit 201 controls the wireless communication unit 203 to transmit a response packet to the image capturing apparatus 100. The response packet can include a notification that the wireless communication is to be disconnected, as well as information of a time for which the communication apparatus 200 will continue to make the notification after the wireless communication is disconnected. After the response has been transmitted, in S327, the control unit 201 controls the wireless communication unit 203 to disconnect the wireless communication. Then, in S328, the control unit 201 determines that the shooting preparations in the image capturing apparatus 100 have succeeded, and the process moves to S329, where the user is notified. In S329, the control unit 201 controls the display unit 205 to light an LED, for example, to notify the user that the shooting preparations in the image capturing apparatus 100 are complete. However, the user may instead be notified by, for example, controlling the vibration unit 206 to produce a predetermined vibration pattern, controlling the buzzer 207 to output predetermined audio, or the like. Once a predetermined amount of time has passed, in S330, the control unit 201 controls the display unit 205 or the like to end the notification. This ends the processing on the communication apparatus 200 side. Once the notification has ended, the control unit 201 enters the sleep state in order to avoid consuming battery power.

Meanwhile, on the image capturing apparatus 100 side, when the control unit 101 determines in S311 that the wireless communication unit 115 has received a response from the communication apparatus 200, the process moves to S313. The received response packet includes the notification that the wireless communication is to be disconnected, and thus in S313 the control unit 101 controls the wireless communication unit 115 to disconnect the wireless communication. When the wireless communication is disconnected, the control unit 101 controls the wireless communication unit 115 to restart the transmission of advertising packets. Meanwhile, in S314, the control unit 101 determines that the shooting preparations of S310 have succeeded, and the process moves to S315, where the control unit 101 stands by for the notification in the communication apparatus 200, indicating that the shooting preparations are complete, to end. Based on the response received in S311, the time for which the notification that preparations are complete has been carried out continuously in the communication apparatus 200 is known on the image capturing apparatus 100 side. As such, a standby time can be set in accordance with that continuous amount of time after the response is received in S311. Next, in S316, the control unit 101 drives the shutter 104, the mirror 105, the image sensor 103, and so on to start shooting a moving image. The notification on the communication apparatus 200 side has ended with certainty by this time, and thus light from the LED will not appear in the shot image, and the buzzer sound or vibration sound will not be recorded. Thereafter, the wireless communication unit 115 of the image capturing apparatus 100 enters the connection standby state, in the same manner as before the shooting.

Next, operations of the image capturing apparatus 100 and the communication apparatus 200 in the case where moving image shooting has ended will be described with reference to FIG. 5. First, on the image capturing apparatus 100 side, the moving image shooting continues in S501 and the advertising packets are sent in S502. Thus, the image capturing apparatus 100 is standing by for a connection from the communication apparatus 200.

In the case where the image capturing apparatus 100 is transmitting advertising packets, and the control unit 201 of the communication apparatus 200 detects that the release button 208a of the operation unit 208 has been operated in S521, the process moves to S522. Here, the operation of the release button 208a is made by the user with the intent of ending (stopping) the moving image shooting. In S522, the control unit 201 controls the wireless communication unit 203 to carry out a scanning operation for detecting the advertising packets. Upon detecting an advertising packet, the wireless communication unit 203 is controlled to transmit a wireless connection request, for transitioning to a connected state, to the image capturing apparatus 100.

On the image capturing apparatus 100 side, in S503, the control unit 101 detects that the wireless connection request transmitted by the communication apparatus 200 has been received by the wireless communication unit 115, and the process moves to S504. In S504 and S523, the control unit 101 of the image capturing apparatus 100 controls the wireless communication unit 115 and the control unit 201 of the communication apparatus 200 controls the wireless communication unit 203 in order to execute the wireless connection operations between the two apparatuses.

Once the wireless connection is established between the image capturing apparatus 100 and the communication apparatus 200 in response to the release button 208a being pressed, in S524, the control unit 201 of the communication apparatus 200 controls the wireless communication unit 203 to transmit an operation command to the image capturing apparatus 100. This "operation command" indicates the release button 208a being operated, as detected in S521 in S505, the control unit 101 of the image capturing apparatus 100 detects that the wireless communication unit 115 has received the operation command transmitted from the communication apparatus 200. Here, the shooting mode of the image capturing apparatus 100 is the moving image mode and a moving image is currently being shot, and thus the control unit 101 recognizes the received operation command to be a moving image shooting end command. Accordingly, the process moves to S506, where the control unit 101 controls the operations of the image sensor 103, the shutter 104, and the mirror 105 to end the moving image shooting. Once the control unit 101 has ended the moving image shooting, the process moves to S507, where the control unit 101 controls the wireless communication unit 115 to transmit a notification that the moving image shooting has ended to the communication apparatus 200. The processing from S508 to S510 that follows thereafter is the same as the processing from S311 to S313 in FIG. 3.

Upon the control unit 201 of the communication apparatus 200 detecting that the wireless communication unit 203 has received the notification that moving image shooting has ended from the image capturing apparatus 100 in S525, the process moves to S526. In S526, the control unit 201 controls the wireless communication unit 203 to transmit a response to the image capturing apparatus 100, and in S527, disconnects the wireless communication. In S528, the control unit 201 controls the operations of the communication apparatus 200 to notify the user that the moving image shooting has ended. This may be done by causing the LED of the display unit 205 to blink a predetermined number of times, causing the vibration unit 206 to produce a predetermined vibration pattern, or causing the buzzer 207 to emit a predetermined audio pattern, for example. Any notification method may be used as long as the user is able to recognize that the moving image shooting has ended.

Figure 6:
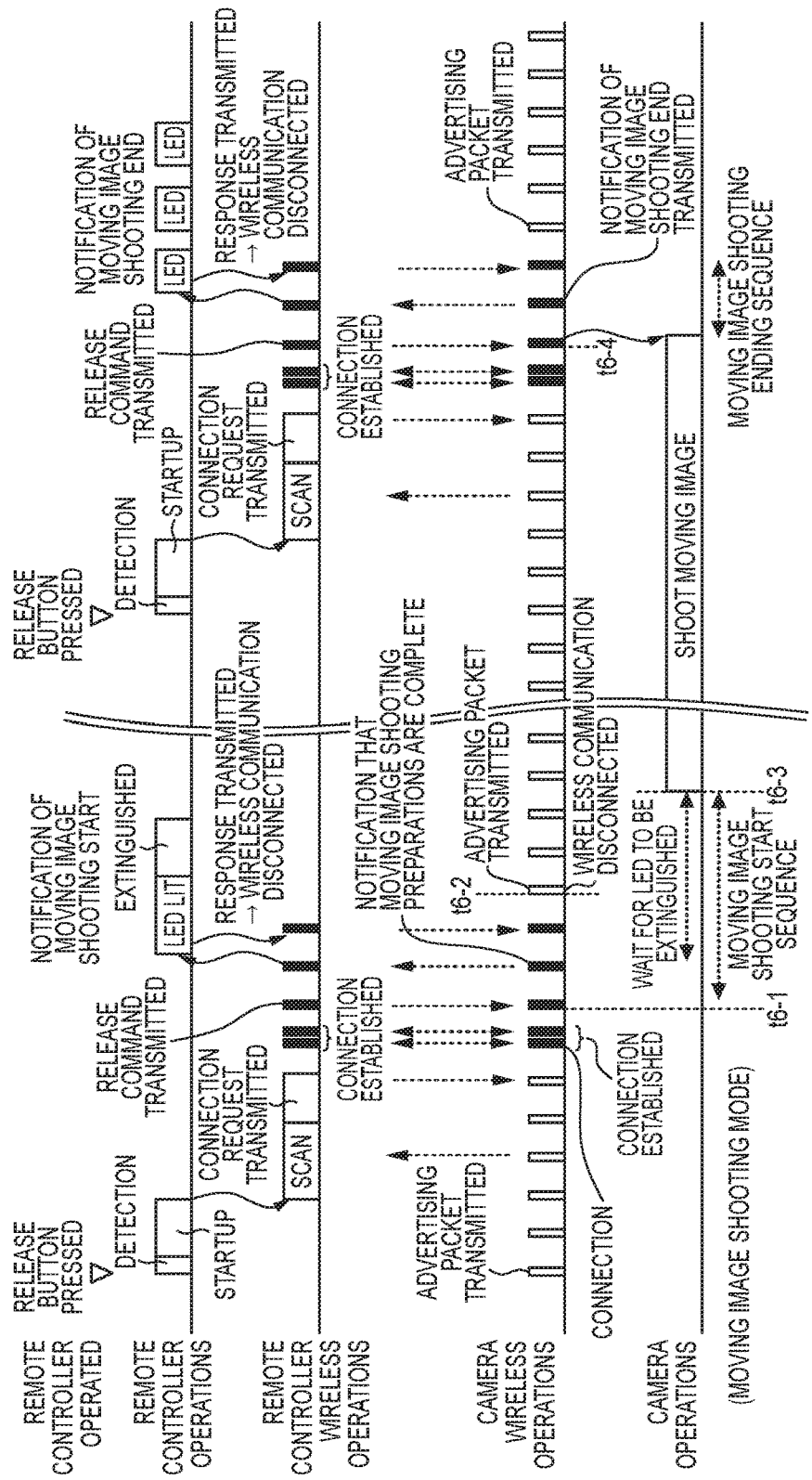
FIG. 6 is an operation sequence chart according to the second embodiment of the invention.

In the operation sequence illustrated in FIG. 6, the moving image shooting start sequence in the first half is almost identical to the still image single shooting sequence illustrated in FIG. 4A. The moving image shooting start sequence does not require preparation operations as when shooting a still image. Thus, when a release command is transmitted from the communication apparatus 200 to the image capturing apparatus 100 at time t6-1, a notification that preparations are complete is immediately transmitted/received, the wireless communication is disconnected, and the transmission of advertising packets is started again at time t6-2. After the communication has been disconnected, the moving image shooting is started (time t6-3) after waiting for the notification to the user on the communication apparatus 200 side (lighting the LED, in FIG. 6) to end. In the moving image shooting ending sequence in the second half too, the release command is transmitted from the communication apparatus 200 to the image capturing apparatus 100 at time t6-4. The ending operations are executed immediately upon the command being received, and the communication apparatus 200 is notified that the moving image shooting has ended. After the ending notification is transmitted/received, the wireless communication is disconnected and the transmission of advertising packets is started again. At this time, the communication apparatus 200 notifies the user that the moving image shooting has ended by lighting the LED, outputting audio, or the like after waiting for the ending notification to be received. Thus the LED display or audio made by the communication apparatus 200 will not appear in or be recorded into the moving image while the moving image is being shot.

According to the present embodiment as described thus far, a wireless connection can be established between the image capturing apparatus 100 and the communication apparatus 200 in response to an operation input made in the communication apparatus 200, and the operation command for starting moving image shooting can be transmitted from the communication apparatus 200 to the image capturing apparatus 100. Once the moving image shooting preparations carried out in response to the received operation command are complete, the image capturing apparatus 100 notifies the communication apparatus 200 that the preparation are complete. In response to this notification, the communication apparatus 200 can disconnect the wireless communication with the image capturing apparatus 100 without waiting for the moving image shooting to start. Then, the user is notified that moving image shooting can be carried out with the image capturing apparatus 100 after the communication has been disconnected. The user can therefore confirm whether or not the moving image shooting will be carried out. Meanwhile, the moving image shooting is started by the image capturing apparatus 100 after the notification made by the communication apparatus 200 has ended, and thus the notification made on the communication apparatus 200 side will not affect the shot moving image, such as the LED display appearing in the moving image, for example.

The image capturing apparatus 100 continues to shoot the moving image even after the wireless connection with the communication apparatus 200 has been disconnected. If an operation input is made in the communication apparatus 200 at this time, the wireless connection between the image capturing apparatus 100 and the communication apparatus 200 can be reestablished, and the operation command for ending the moving image shooting can be transmitted from the communication apparatus 200 to the image capturing apparatus 100. The image capturing apparatus 100 ends the moving image shooting in response to the received operation command, and notifies the communication apparatus 200 that the moving image shooting has ended. In response to this notification, the communication apparatus 200 can notify the user that the moving image shooting has ended and disconnect the wireless communication with the image capturing apparatus 100. The moving image shooting is ended by the image capturing apparatus 100 before the notification is made on the communication apparatus 200 side, and thus the notification made on the communication apparatus 200 side will not affect the shot moving image, such as the LED display appearing in the moving image, for example.

As a result, the moving image shooting process can be started and ended with the communication apparatus 200 carrying out wireless communication with the image capturing apparatus 100 in an efficient manner. It is thus unnecessary to carry out communication using a high amount of bandwidth, and thus the power consumed by the remote control can be reduced, while ensuring good operability, even when using a communication apparatus having a low-capacity battery.

Third Embodiment

Operations according to a third embodiment of the invention will be described hereinafter with reference to FIGS. 3 and 7. The present embodiment describes a case where the image capturing apparatus 100 continuously shoots single still images by being remotely controlled from the communication apparatus 200. Processing carried out when continuously shooting single images according to the present embodiment is executed in the same manner as illustrated in the flowchart in FIG. 3. FIG. 7 is a sequence chart corresponding to the processing for continuously shooting single images, and illustrates operations of the various parts in time series from left to right.

In the first embodiment, the operations of the image capturing apparatus 100 end with the shooting carried out in S316 of FIG. 3. However, in the present embodiment, the process returns to S303 after S316 and continues thereafter. This makes it possible to continuously accept remote control from the communication apparatus 200. On the communication apparatus 200 side too, the process returns to S321 and continues thereafter after the notification in S330 has ended. As a result, operations of the release button 208a can be accepted continuously.

According to the present embodiment, in the operation sequence illustrated in FIG. 7, the release button 208a of the communication apparatus 200 is operated again once the LED is extinguished and the first still image has been shot. With respect to the operations of the communication apparatus 200 at this time, the control unit 201 may or may not be in the sleep state immediately after the LED is extinguished. In the case where the control unit 201 is in the sleep state, the control unit 201 is started up again in response to the release button being operated in S121, and transmits the wireless connection request again in S122.

With respect to operations on the image capturing apparatus 100 side, after the wireless communication is disconnected in S113, the control unit 101 controls the wireless communication unit 115 to restart the transmission of the advertising packets and thus stands by for a connection from the communication apparatus 200. When, in this state, the wireless connection request is received from the communication apparatus 200 in S322, the control unit 101 executes the wireless connection operations of S307 again. Thus according to the present embodiment, the still image shooting sequence and the wireless connection operations are carried out in parallel, and thus the image capturing apparatus 100 can quickly respond to continuous shooting.

However, like the first embodiment, the processing from the AF operations being started to the shooting of the still image being completed corresponds to the still image single shooting sequence in the present embodiment as well, as indicated in the operation sequence illustrated in FIG. 7. Accordingly, the shooting preparation operations for the next image cannot be carried out until the still image single shooting sequence is complete. Thus, even if the release button 208a is operated repeatedly on the communication apparatus 200 side, the next shooting operation cannot be started immediately. Thus, in the present embodiment, a wireless connection can be accepted even midway through the still image shooting sequence, but the next release command cannot be accepted.

In the case where, for example, the user operates the release button 208a twice in rapid succession and a release command is thus transmitted before the first still image single shooting sequence is complete, the image capturing apparatus 100 cannot accept the second operation. Accordingly, the control unit 101 controls the wireless communication unit 115 to transmit, to the communication apparatus 200, a notification indicating that the operation could not be accepted in S310. In this case, on the communication apparatus 200 side, the control unit 201 determines in S328 that the preparations have failed, and does not make the notification of S329. The user can therefore recognize that the second image was not shot.

However, the image capturing apparatus 100 can accept the release command if the release command is received after the still image single shooting sequence is complete, as illustrated in FIG. 7. The sequence carried out thereafter is the same as for the first image. In other words, in the shooting of the second image too, the communication apparatus 200 is notified once the shooting preparations are complete, and the LED is lit. The user can thus easily recognize whether or not the shooting has succeeded. The same sequence is carried out for the third, fourth, and subsequent images as well.

According to the present embodiment as described thus far, a wireless connection can be established between the image capturing apparatus 100 and the communication apparatus 200 in response to an operation input made in the communication apparatus 200, and still image single shooting can be executed continuously by remotely controlling the image capturing apparatus 100. At this time, the continuous shooting can be executed with the communication apparatus 200 carrying out wireless communication with the image capturing apparatus 100 in an efficient manner. It is thus unnecessary to carry out communication using a high amount of bandwidth, and thus the power consumed by the remote control can be reduced, while ensuring good operability, even when using a communication apparatus having a low-capacity battery.

Fourth Embodiment

Figure 8A:
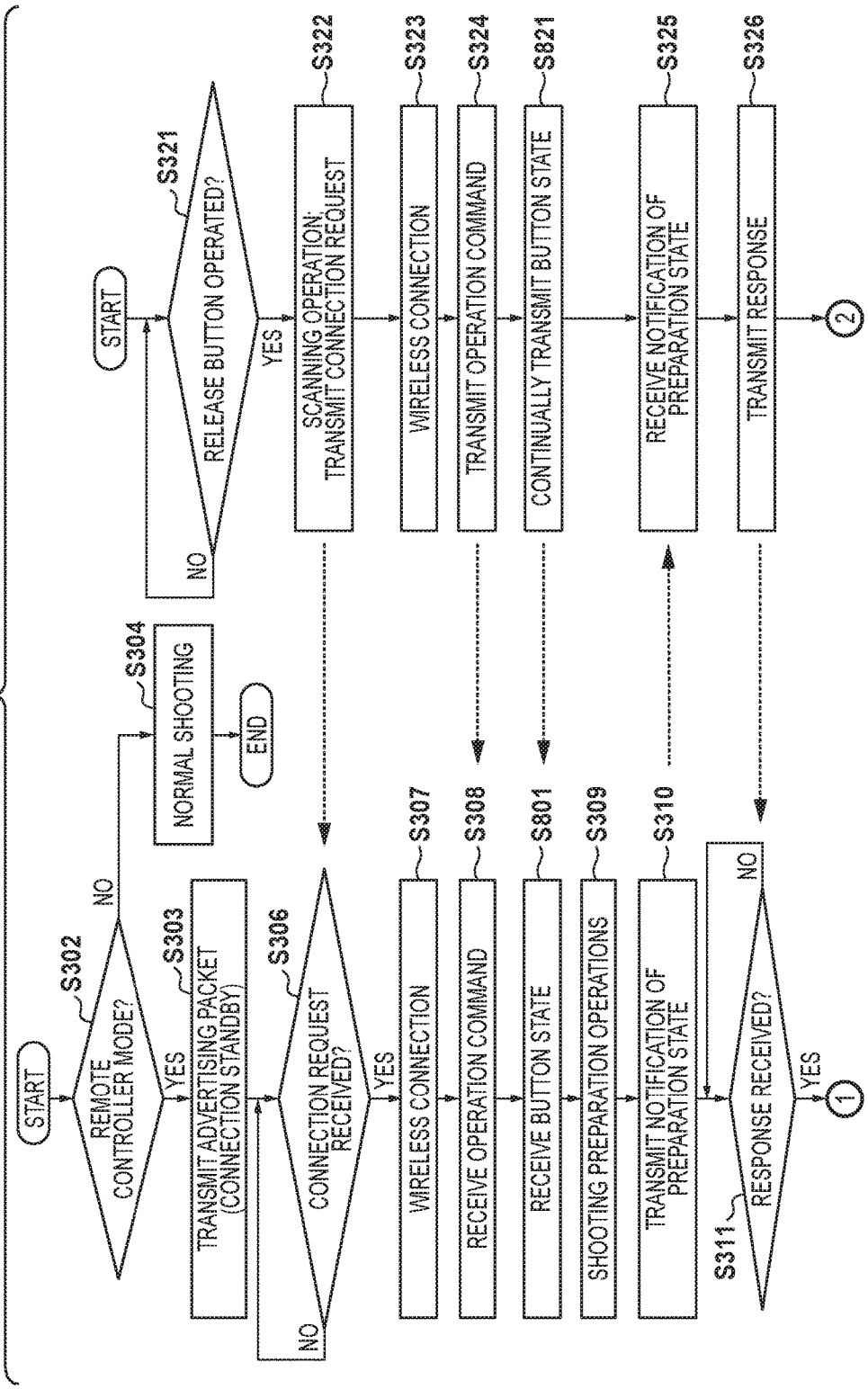
FIG. 8A and FIG. 8B are flowcharts illustrating an example of processing according to a fourth embodiment of the invention.
Figure 8B:
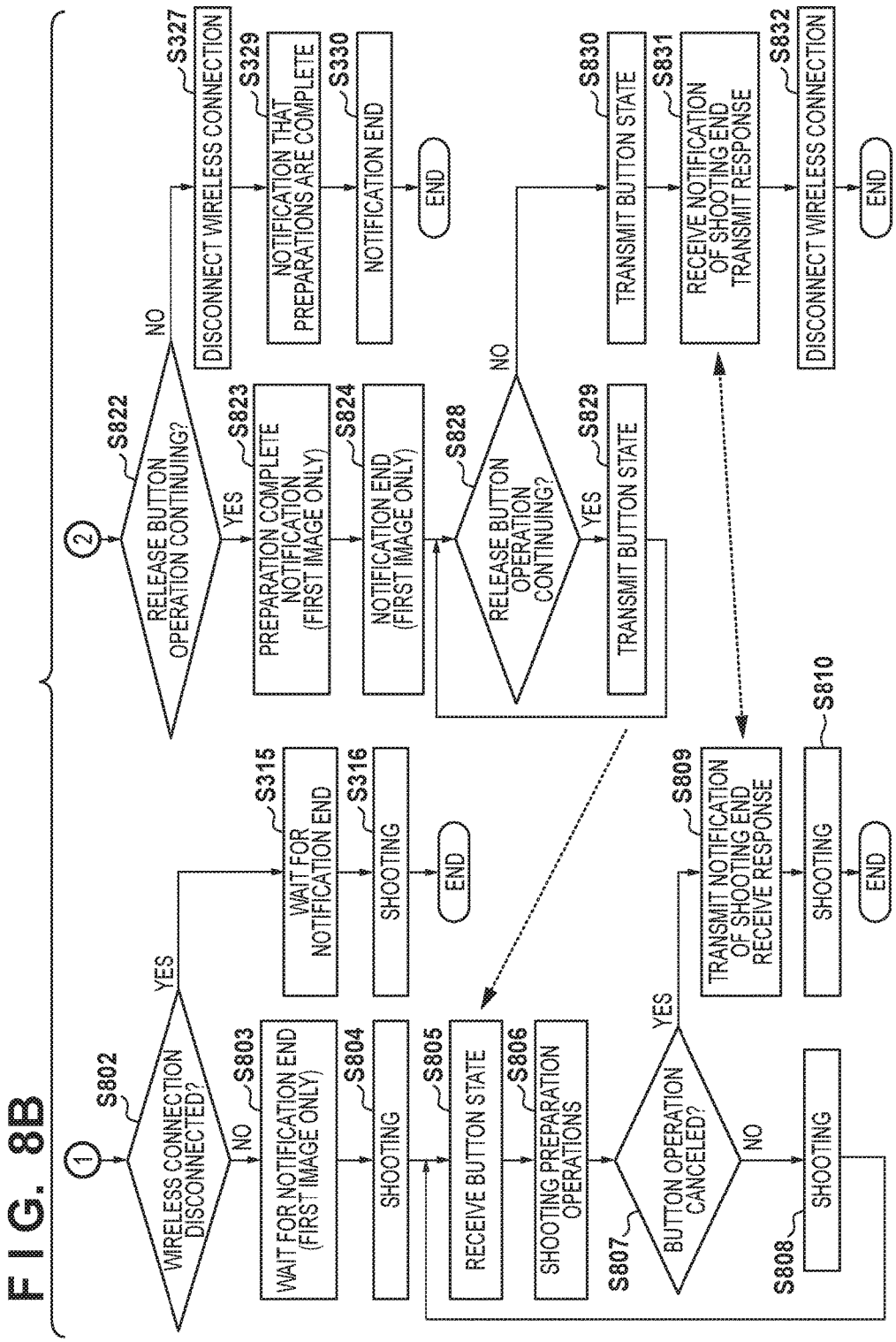
Figure 9:
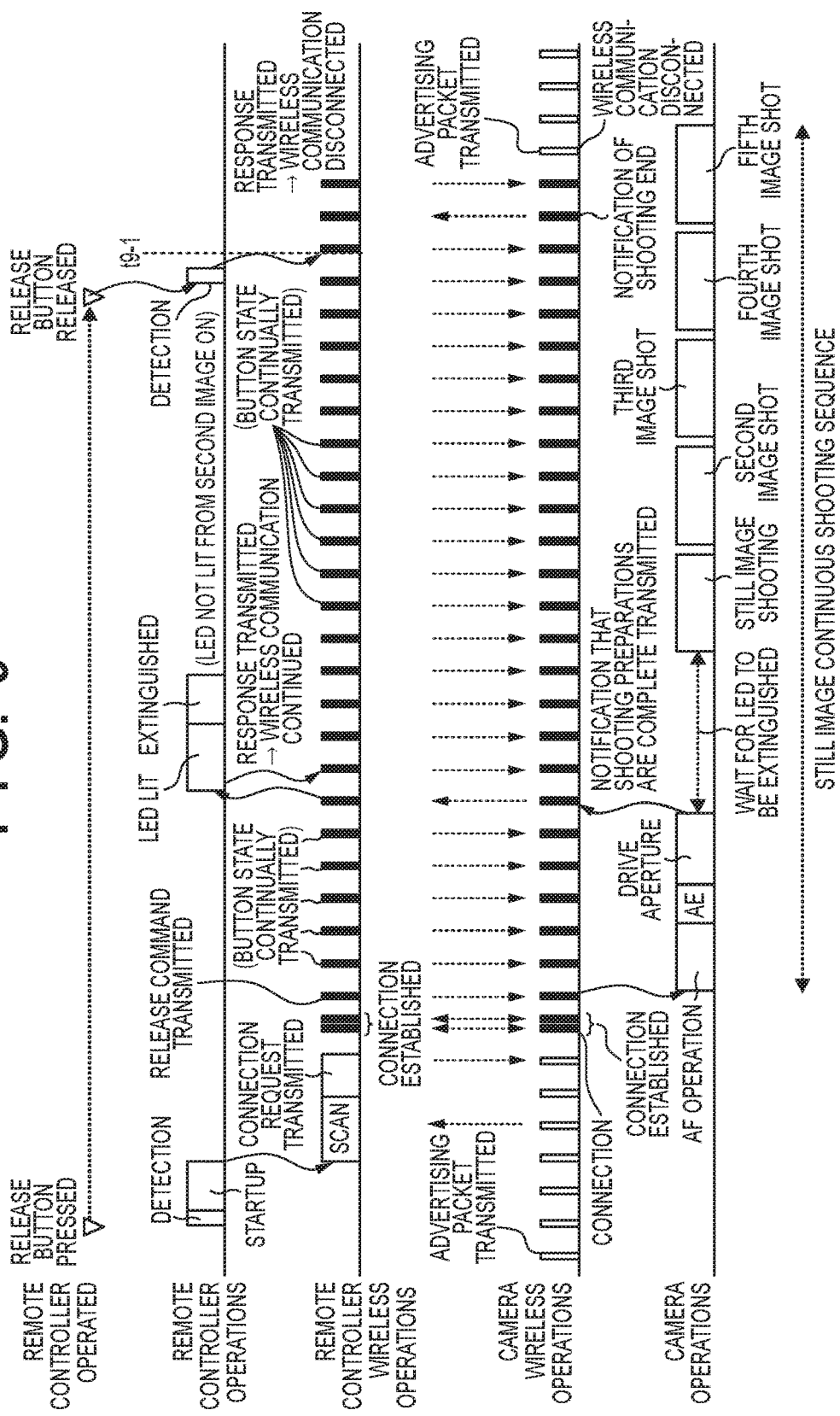
FIG. 9 is an operation sequence chart according to the fourth embodiment of the invention.

Operations according to a fourth embodiment of the invention will be described hereinafter with reference to FIGS. 8A, 8B and 9. The present embodiment describes a case where the image capturing apparatus 100 performs continuous shooting of still images by being remotely controlled from the communication apparatus 200. Processing carried out when continuous shooting according to the present embodiment can be executed according to the flowcharts in FIGS. 8A and 8B. However, part of the processing illustrated in FIGS. 8A and 8B is processing that can be executed in the same manner as the processing illustrated in FIG. 3. Thus, steps in FIGS. 8A and 8B that correspond to steps in FIG. 3 are assigned the same reference numerals. FIG. 9 is a sequence chart corresponding to the processing for continuous shooting, and illustrates operations of the various parts in time series from left to right.

The present embodiment assumes that in the image capturing apparatus 100, the still image/moving image toggle switch 117 is set to a still image continuous shooting mode. The present embodiment also assumes that the operation made by the user in the communication apparatus 200 is an operation where the user presses and holds the release button 208a. Additionally, in the present embodiment, the image capturing apparatus 100 performs continuous shooting while the release button 208a of the communication apparatus 200 is being held down and then ends the continuous shooting when the release button 208a is released. Furthermore, if, when performing continuous shooting of still images, the user is notified by lighting and extinguishing the LED each time a still image is shot as described in the foregoing embodiments, the shooting operations cannot be carried out during that time. This results in a lower shooting rate than in the case where the image capturing apparatus 100 is operated directly. Accordingly, in the present embodiment, control is carried out such that the user is only notified before the start of shooting the first still image, and the user notification is omitted from the second image on.

In the present embodiment, processing on the image capturing apparatus 100 side when shooting the first image is the same as the processing carried out from S302 to S308 in FIG. 3, and thus descriptions thereof will be omitted. Likewise, processing on the communication apparatus 200 side is the same as the processing carried out from S321 to S324 in FIG. 3, and thus descriptions thereof will be omitted. In the present embodiment too, a wireless connection is established between the image capturing apparatus 100 and the communication apparatus 200 in response to the release button 208a of the communication apparatus 200 being operated.

Once the wireless connection is established, the image capturing apparatus 100 and the communication apparatus 200 exchange information periodically, at set intervals, as indicated by the black rectangles in FIG. 9. In the present embodiment, a pressing state of the release button 208a of the communication apparatus 200 is continuous. Thus, while the pressing state continues, in 5821, the control unit 201 of the communication apparatus 200 controls the wireless communication unit 203 to add packets to the periodic exchange of information and notify the image capturing apparatus 100 of the pressing state of the release button 208a. The "pressing state" includes both a state in which the button is held down and a state in which the button is not pressed. The notification of the pressing state may be made by, for example, communicating the type of the button being pressed, or by communicating the state of each button in the communication apparatus 200 (whether or not the button is pressed or is on/off). The image capturing apparatus 100 can detect a button operation in accordance with changes in the information of the pressing state communicated by the communication apparatus 200. The notification of the state of a button may be made by transmitting an operation command corresponding to the operation of that button. As long as the pressing state of the release button 208a continues, the transmission of the button state in S821 is carried out in parallel with the processing following thereafter.

On the image capturing apparatus 100 side, in S308, the control unit 101 of the image capturing apparatus 100 detects that the wireless communication unit 115 has received the first operation command transmitted from the communication apparatus 200. In the present embodiment, after the first operation command has been transmitted, an operation command based on the release button 208a continuing to be pressed is transmitted from the communication apparatus 200 periodically. Accordingly, in S801, the control unit 101 of the image capturing apparatus 100 detects that the wireless communication unit 115 has received the subsequent operation commands transmitted from the communication apparatus 200. As long as the pressing state of the release button 208a continues on the communication apparatus 200 side, the reception of the button state in S801 is carried out in parallel with the processing following thereafter. As a result, the image capturing apparatus 100 can recognize what state the button of the communication apparatus 200 is in almost in real time.

The processing from S309 to S311 on the image capturing apparatus 100 side and the processing from S325 to S326 on the communication apparatus 200 are the same as the processing described with reference to the corresponding reference numerals in FIG. 3.

On the communication apparatus 200 side, after the response has been transmitted in S326, the control unit 201 determines, in S822, whether or not the operation made through the release button 208a is continuing. When the control unit 201 determines that the operation is not continuing, the process moves to S327 and the wireless connection is disconnected. In steps S327, S329 and S330, the same processes as in the steps in FIG. 3 having the corresponding reference numerals is carried out, after which the process ends. Meanwhile, on the image capturing apparatus 100 side, when the control unit 101 determines in S311 that the wireless communication unit 115 has received a response from the communication apparatus 200, the process moves to S802. In S802, the control unit 101 determines whether or not the wireless connection with the communication apparatus 200 has been disconnected. In the case where the control unit 101 has determined that the wireless connection has been disconnected, the process moves to S315. The shooting is then executed in S316, and the process then ends. This processing is the same as the processing described with reference to S315 and S316 in FIG. 3. In this case, a single still image is shot instead of continuous shooting of still images.

Next, on the communication apparatus 200 side, the control unit 201 determines in S822 that the operation of the release button 208a is continuing, and the process moves to S823. In S823, the control unit 201 controls the display unit 205 to light an LED, for example, to notify the user that the shooting preparations in the image capturing apparatus 100 are complete. Then, once a predetermined amount of time has passed, in S824, the control unit 201 controls the display unit 205 or the like to end the notification. This notification process is substantially the same as the processing described with reference to S329 and S330 in FIG. 3, but is only carried out for the first image shot in the continuous shooting in the present embodiment.

Meanwhile, on the image capturing apparatus 100 side, in the case where the control unit 101 has determined in S802 that the wireless connection has not been disconnected, the process moves to S803, where the control unit 101 stands by for the notification that the shooting preparations are complete to end in the communication apparatus 200. The standby process of S803 is substantially the same as S315, but is only carried out for the first image shot in the continuous shooting in the present embodiment. Next, in S804, the control unit 101 drives the shutter 104, the mirror 105, the image sensor 103, and so on to shoot the first still image. The notification on the communication apparatus 200 side has ended by this time, and thus light from the LED will not appear in the shot image.

The shooting of the first still image shot in the continuous shooting ends in this manner. Thereafter, on the communication apparatus 200 side, the control unit 201 determines, in S828, whether or not the pressing operation of the release button 208a is continuing. In the case where the control unit 201 has determined that the pressing state is continuing, the process moves to S829, where the control unit 201 controls the wireless communication unit 203 to notify the image capturing apparatus 100 of the button state, namely that the pressing of the release button 208a is continuing. On the other hand, in the case where the control unit 201 has determined that the pressing state is not continuing, the process moves to S830, where the control unit 201 controls the wireless communication unit 203 to notify the image capturing apparatus 100 of the button state, namely that the release button 208a has been released. Then, in S831, upon detecting that the wireless communication unit 203 has received a notification that shooting has ended, the control unit 201 controls the wireless communication unit 203 to transmit a response to the image capturing apparatus 100. This response can include a notification that the wireless connection will be disconnected on the communication apparatus 200 side. Then, in S832, the control unit 201 controls the wireless communication unit 203 to disconnect the wireless connection with the image capturing apparatus 100.

On the image capturing apparatus 100 side, in S805, the control unit 101 of the image capturing apparatus 100 detects that the wireless communication unit 115 has received the notification of the button state transmitted from the communication apparatus 200. Next, in S806, the control unit 101 carries out the shooting preparation operations for shooting the second and subsequent still images. Then, in S807, the control unit 101 determines whether or not the release button 208a has been released, on the basis of the details of the button state received in S805. The process moves to S809 when the control unit 101 determines that the button has been released. In S809, the control unit 101 controls the wireless communication unit 115 to transmit a notification that the shooting has ended to the communication apparatus 200 and receive a response from the communication apparatus 200. The wireless connection may be disconnected upon the response being received. Then, in S810, the control unit 101 causes the still image to be shot and completes the still image continuous shooting process. On the other hand, in the case where the control unit 101 has determined that the pressing state is continuing, the process moves to S808, The still image is then shot, after which the process returns to S805 and continues therefrom.

As a result, after the first still image has been shot, the continuous shooting continues until the release button 208a is released on the communication apparatus 200 side. Although S802 is described as being a determination as to whether or not the wireless connection has been disconnected, the image capturing apparatus 100 is continually receiving the button state from the communication apparatus 200. As such, whether or not the release button 208a has been released may be determined, and the wireless connection may be disconnected and the continuous shooting ended, on the image capturing apparatus 100 side.

In FIG. 9, a notification that the button state has changed (that is, a notification that the release button 208a has been released) is transmitted to the image capturing apparatus 100 using a wireless communication packet at the transmission time t9-1 following the release button 208a being released on the communication apparatus 200 side. In response to this, the image capturing apparatus 100 transmits a notification that shooting has ended to the communication apparatus 200, the communication apparatus 200 transmits a corresponding response, and the wireless communication is disconnected. After this, the communication apparatus 200 enters the sleep state and stands by for another operation from the user. Meanwhile, the image capturing apparatus 100 disconnects the wireless communication after transmitting the notification that shooting has ended to the communication apparatus 200. However, if the shooting sequence is underway at that time, the shooting is carried out until the final image is shot, rather than interrupting the shooting. The still image continuous shooting sequence is complete once the final image has been shot.

In the descriptions given above with reference to FIGS. 8A, 8B and 9, after the release button 208a has been released, the communication apparatus 200 disconnects the wireless connection after receiving the notification that shooting has ended and transmitting a response thereto. The embodiment of the invention is not limited thereto, however. For example, in the case where the button has been released, the wireless connection may be disconnected after transmitting the corresponding notification of the button state to the image capturing apparatus 100, without waiting for the notification that shooting has ended from the image capturing apparatus 100.

Additionally, although the present embodiment describes continuous shooting of still images, it is also possible to shoot a moving image only while the release button 208a is being pressed, in the same manner as described above.

According to the present embodiment as described thus far, a wireless connection can be established between the image capturing apparatus 100 and the communication apparatus 200 in response to an operation input made in the communication apparatus 200, and still images can be continuously shot by remotely controlling the image capturing apparatus 100 from the communication apparatus 200. At this time, when the release button 208a is released, the communication apparatus 200 can disconnect the wireless communication with the image capturing apparatus 100 without waiting for the continuous shooting to actually be completed. As a result, the still image continuous shooting process can be executed with the communication apparatus 200 carrying out wireless communication with the image capturing apparatus 100 in an efficient manner. It is thus unnecessary to carry out communication using a high amount of bandwidth, and thus the power consumed by the remote control can be reduced, while ensuring good operability, even when using a communication apparatus having a low-capacity battery.

Fifth Embodiment

Operations according to a fifth embodiment of the invention will be described hereinafter with reference to FIGS. 10 and 11. The present embodiment describes a case where the image capturing apparatus 100 executes a predetermined camera control operation by being remotely controlled from the communication apparatus 200. As illustrated in FIG. 2, the communication apparatus 200 includes, in addition to the release button 208a, the AF button 208b and the zoom buttons 208c and 208d, which are buttons for adjusting shooting conditions of the digital camera serving as the image capturing apparatus 100. The present embodiment describes processing carried out in the case where a button aside from the release button 208a has been operated. By pressing these buttons, the user can execute the corresponding camera control operation alone, independent from the shooting. Although the following describes a case where the AF button 208b in particular is operated, the same applies to cases where other buttons are operated.

Figure 10:
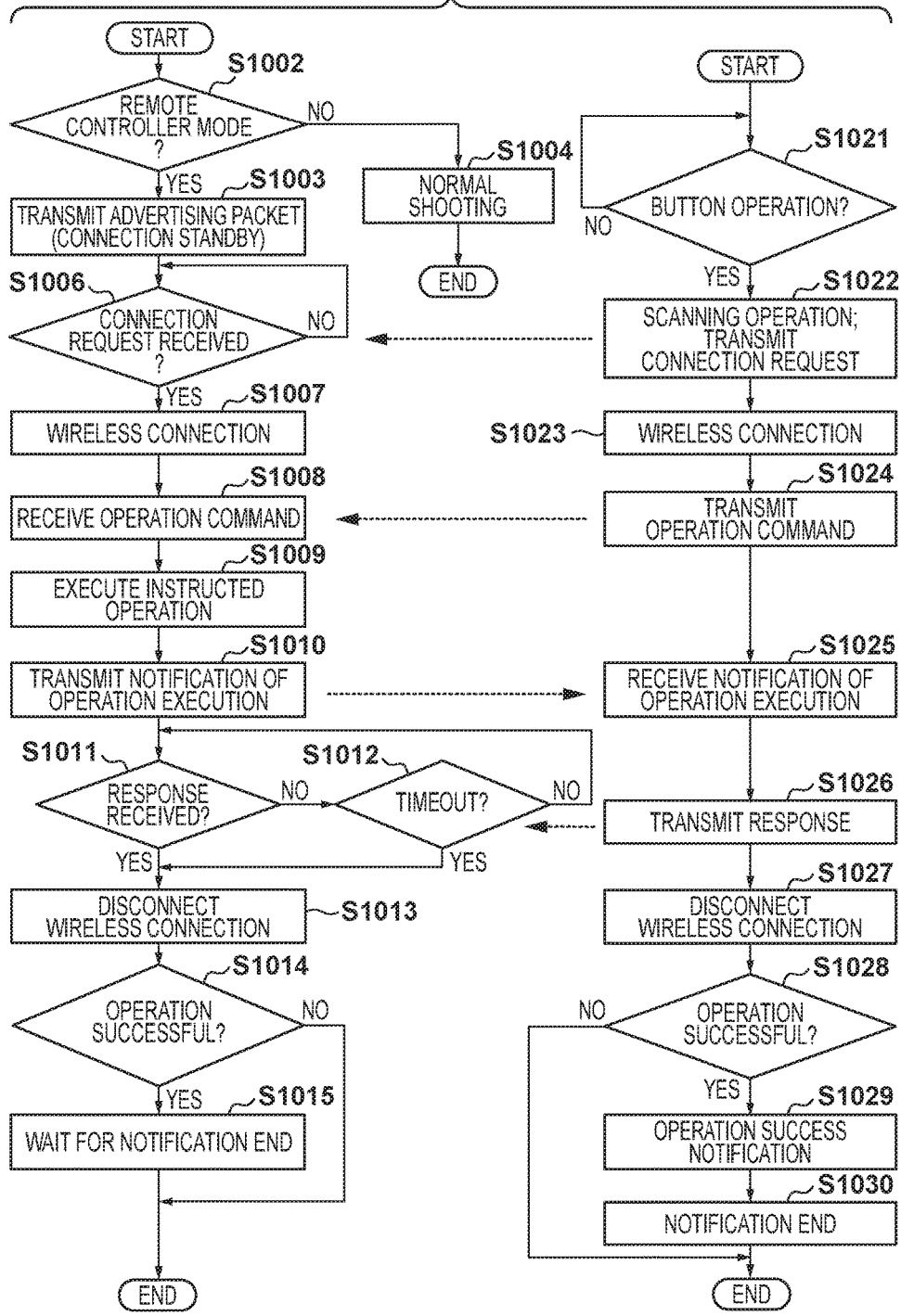
FIG. 10 is a flowchart illustrating an example of processing according to a fifth embodiment of the invention.

FIG. 10 is a flowchart illustrating an example of operations carried out by the image capturing apparatus 100 and the communication apparatus 200 in the case where a camera control operation is executed in response to remote control from the communication apparatus 200. FIG. 11, meanwhile, is a sequence chart corresponding to FIG. 10, and illustrates operations of the various parts in time series from left to right.

First, the processing from S1002 to S1007 on the image capturing apparatus 100 side is the same as the processing from S302 to S307 indicated in FIG. 3. In the case where the image capturing apparatus 100 is transmitting advertising packets, and the control unit 201 of the communication apparatus 200 detects that a button of the operation unit 208, particularly the AF button 208b, has been operated in S1021, the process moves to S1022. The processing in S1022 and S1023 is the same as the processing in S322 and S323 in FIG. 3.

Once the wireless connection is established between the image capturing apparatus 100 and the communication apparatus 200 in response to the button being operated, in S1024, the control unit 201 of the communication apparatus 200 controls the wireless communication unit 203 to transmit an operation command to the image capturing apparatus 100. This "operation command" indicates the AF button 208b being operated, as detected in S1021. On the other hand, in S1008, the control unit 101 of the image capturing apparatus 100 detects that the wireless communication unit 115 has received the operation command transmitted from the communication apparatus 200. The control unit 101 recognizes the received operation command as an AF command. In S1009, the control unit 101 executes AF operations instructed to be carried out by the communication apparatus 200. Furthermore, in S1010, the control unit 101 controls the wireless communication unit 115 to notify the communication apparatus 200 of a result of the operations executed in S1009. In the case of AF operations, for example, the communication apparatus 200 is notified that the focus has succeeded when such is the result of the operations. On the communication apparatus 200 side, in S1025, the control unit 201 detects that the wireless communication unit 203 has received the notification that operations have been executed, transmitted by the image capturing apparatus 100. Then, in S1026, the control unit 201 controls the wireless communication unit 203 to transmit a response packet to the image capturing apparatus 100. The response packet includes a notification indicating that the wireless communication will be disconnected. After the response has been transmitted, in S1021, the control unit 201 controls the wireless communication unit 203 to disconnect the wireless communication.

The subsequent processing from S1011 to S1013 on the image capturing apparatus 100 side is the same as the processing from S311 to S313 indicated in FIG. 3. In S1019, the control unit 101 determines whether or not the operations executed in S1009 have succeeded. In the case where the control unit 101 has determined that the operations have succeeded, the process moves to S1015. In the case where the control unit 101 has determined that the operations have failed, the process ends. In S1015, the control unit 101 stands by for the notification that the operations have succeeded, made by the communication apparatus 200, to end. Based on the response received in S1011, the image capturing apparatus 100 has already been notified of the time for which the notification that the operations have succeeded will continue in the communication apparatus 200. As such, a standby time can be set in accordance with that continuous amount of time after the response is received in S1011. The image capturing apparatus 100 transmits advertising packets while waiting for the notification to end in S1015, but does not accept the next operation command.

On the communication apparatus 200 side, in S1028, the control unit 201 determines whether or not the operations have succeeded in the image capturing apparatus 100. In this case, it is determined whether the AF operations have succeeded. In the case where the control unit 201 has determined that the operations have succeeded, the process moves to S1029, where the user is notified. On the other hand, in the case where the control unit 201 has determined that the operations have failed, the process ends without notifying the user.

In S1029, the control unit 201 controls the display unit 205 to light an LED, for example, to notify the user that the AF operations in the image capturing apparatus 100 have succeeded. In the case where the AF operations have succeeded, the LED of the display unit 205 may blink twice in order to distinguish that success from the success of another operation. The LED blinking twice differs from the notification that still image shooting preparations are complete, the notification that moving image shooting has started or ended, and so on, and the user can therefore recognize that the AF operations have succeeded. The notification may be the same as the other methods, too. This is because the notification is made in response to the user operating the AF button 208b, and thus the user can recognize that the AF operations have succeeded. Instead of lighting an LED, the user may be notified by, for example, controlling the vibration unit 206 to produce a predetermined vibration pattern, controlling the buzzer 207 to output predetermined audio, or the like. Once a predetermined amount of time has passed, in S1030, the control unit 201 controls the display unit 205 or the like to end the notification. This ends the processing on the communication apparatus 200 side.

Figure 11:
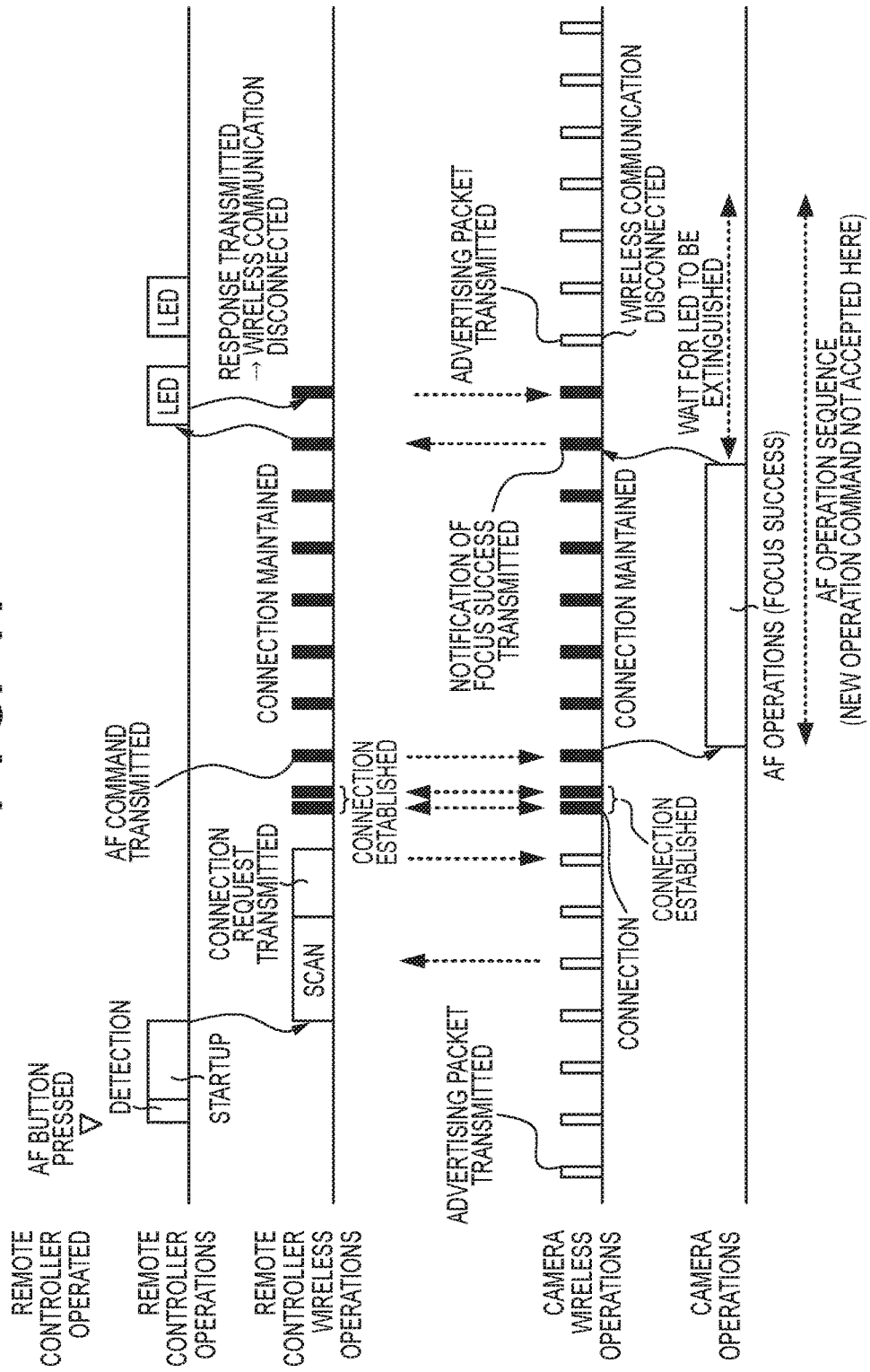
FIG. 11 is an operation sequence chart according to the fifth embodiment of the invention.

In the operation sequence illustrated in FIG. 11, the sequence from "AF operation start" to "wait for LED to be extinguished" in the camera operations indicated in the lowermost section corresponds to an AF operation sequence. In the present embodiment, the next operation command is not accepted during this AF operation sequence. This is because if the next operation command is accepted midway through the sequence and the next operation is carried out, the notification that the operation has succeeded will be continuously executed. This will confuse the user and potentially cause erroneous operations. However, the wireless connection between the communication apparatus 200 and the image capturing apparatus 100 is disconnected without waiting for the AF operation sequence to be complete, even midway through the operation sequence. This makes it possible to keep the wireless communication time as short as possible. Additionally, even if the wireless connection is disconnected, the image capturing apparatus 100 has already received the notification that the AF operation has succeeded, and thus the state of the AF operation can be reliably communicated to the user.

Although the present embodiment describes a case where the user is notified by the LED blinking after the focus has succeeded, a situation is conceivable in which the release button is operated during AF operations, such as the case where the AF mode is set to a servo mode. In this case, it is possible to prioritize the shooting over the user notification, and omit the operation for lighting the LED. In such a case as well, the effect of improving both the operability and the battery life can be achieved by keeping the wireless communication time as short as possible and notifying the user of the state of shooting operations.

In addition to the above-described embodiment, predetermined operations for adjusting shooting conditions may be controlled as described hereinafter. For example, in the case where AF operations have been carried out by operating the AF button, the control unit 201 of the communication apparatus 200 may control the wireless communication unit 203 so as not to immediately disconnect the wireless communication even if a notification that focusing operations have succeeded has been received. This is because when carrying out AF operations, the user is likely to press the release button next. Additionally, the AF button is typically operated in order to bring the subject into focus, and thus it is likely that the user will press the AF button repeatedly. In other words, it is possible that a connection will be established and disconnected repeatedly in a short amount of time. Typically, BLE communication consumes the most power per unit of time during the scanning operation. Thus, omitting the scanning operation and maintaining the connection is more efficient when operations are repeated throughout a short amount of time. Maintaining the connection is also more efficient in terms of the responsiveness to operations. Accordingly, in the case where the AF button has been operated, the wireless connection may be maintained until the release button is pressed, for example. Alternatively, the connection may be disconnected later in the case where the AF button is pressed than in the case where the release button is pressed. This makes it possible reduce the consumed power while also ensuring usability.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110220, filed Jun. 1, 2016, which is hereby incorporated by reference herein in its entirety.

What is claimed is:

1. A communication apparatus that causes an external apparatus to operate through a remote control, the communication apparatus comprising:
at least one processor or circuit to perform the operations of:
a communication unit configured to wirelessly communicate with the external apparatus; and
an instruction accepting unit configured to accept an instruction of an operation for the external apparatus to execute,
wherein the communication unit:
establishes a wireless connection with the external apparatus upon the instruction accepting unit accepting the instruction, and transmits an operation command corresponding to the instruction to the external apparatus; and
disconnects the wireless connection with the external apparatus upon the external apparatus executing part of a series of operations corresponding to the operation command, without waiting for the remaining operations to be executed,
wherein in the case where the operation executed by the external apparatus is a shooting operation and the instruction accepting unit continuously accepts an instruction for the shooting operation,
the communication unit maintains the wireless connection with the external apparatus even after the external apparatus has executed part of the operations corresponding to the operation command,
wherein in the case where, after the instruction accepting unit has continuously accepted the instruction for the shooting operation, the instruction accepting unit no longer accepts the instruction,
the communication unit disconnects the wireless connection with the external apparatus after the instruction is no longer being accepted.

2. The communication apparatus according to claim 1, wherein in the case where the operation executed by the external apparatus is a shooting operation, the communication unit disconnects the wireless connection with the external apparatus before the external apparatus starts the shooting.

3. The communication apparatus according to claim 2, wherein the communication unit disconnects the wireless connection with the external apparatus upon a predetermined operation for shooting being carried out in the external apparatus.

4. The communication apparatus according to claim 3, wherein the at least one processor or circuit further performs the operations of:
a notification unit configured to make a notification to a user of the communication apparatus,
wherein upon the predetermined operation for shooting being carried out in the external apparatus, the notification unit makes the notification to the user before the external apparatus starts the shooting.

5. The communication apparatus according to claim 2, wherein the communication unit disconnects the wireless connection with the external apparatus upon a predetermined operation for shooting failing in the external apparatus.

6. The communication apparatus according to claim 3, wherein the predetermined operation is a preparation operation for shooting carried out by the external apparatus.

7. The communication apparatus according to claim 4,
wherein the case where the shooting operation is a moving image shooting operation, and the instruction accepting unit has accepted an instruction for an operation of ending moving image shooting after the communication unit has disconnected the wireless connection with the external apparatus,
the communication unit:
establishes a wireless connection with the external apparatus upon the instruction for the operation of ending moving image shooting being accepted, and transmits an operation command corresponding to the instruction to the external apparatus; and
disconnects the wireless connection with the external apparatus upon moving image shooting ending in the external apparatus in response to the operation command, and
the notification unit makes a notification to the user after the moving image shooting has ended in the external apparatus.

8. The communication apparatus according to claim 1,
wherein in the case where, after the instruction accepting unit has continuously accepted the instruction for the shooting operation, the instruction accepting unit no longer accepts the instruction,
the communication unit disconnects the wireless connection with the external apparatus in response to an operation in the external apparatus corresponding to the instruction no longer being accepted.

9. The communication apparatus according to claim 1, wherein the at least one processor or circuit further performs the operations of:
a notification unit configured to make a notification to a user of the communication apparatus,
wherein upon a predetermined operation for shooting being carried out in the external apparatus, the notification unit makes a notification to the user before the start of a first shooting of continuous shooting carried out by the external apparatus in response to the continuously-accepted instruction for the shooting operation.

10. The communication apparatus according to claim 1,
wherein in the case where the operation executed by the external apparatus is an operation for adjusting a shooting condition,
the communication unit disconnects the wireless connection with the external apparatus before the external apparatus can accept a subsequent operation command.

11. The communication apparatus according to claim 10,
wherein the operation for adjusting the shooting condition includes at least one of an AF operation, an AE operation, and an aperture operation.

12. The communication apparatus according to claim 1,
wherein in the case where the operation executed by the external apparatus is an operation for adjusting a shooting condition,
the communication unit maintains the wireless connection with the external apparatus until the instruction accepting unit accepts an instruction for a shooting operation.

13. The communication apparatus according to claim 1,
wherein the communication unit receives a notification regarding the part of the series of operations being executed from the external apparatus, and disconnects the wireless connection in response to receiving the notification.

14. The communication apparatus according to claim 13,
wherein in the case where the communication unit has received the notification regarding the part of the series of operations being executed, the communication unit transmits a response to that reception to the external apparatus, and then disconnects the wireless connection.

15. The communication apparatus according to claim 13,
wherein in the case where the communication unit does not receive the notification regarding the part of the series of operations being executed within a certain period, the communication unit disconnects the wireless connection.

16. A control method for a communication apparatus, the communication apparatus including a communication unit that wirelessly communicates with an external apparatus and an instruction accepting unit that accepts an instruction of an operation for the external apparatus to execute, and causing an external apparatus to operate through a remote control, the method comprising:
establishing a wireless connection with the external apparatus upon the instruction accepting unit accepting the instruction;
transmitting an operation command corresponding to the instruction to the external apparatus; and
disconnecting the wireless connection with the external apparatus upon the external apparatus executing part of a series of operations corresponding to the operation command, without waiting for the remaining operations to be executed,
further comprising:
in the case where the operation executed by the external apparatus is a shooting operation and the instruction accepting unit continuously accepts an instruction for the shooting operation, maintaining the wireless connection with the external apparatus even after the external apparatus has executed part of the operations corresponding to the operation command; and
in the case where, after the instruction accepting unit has continuously accepted the instruction for the shooting operation, the instruction accepting unit no longer accepts the instruction, disconnecting the wireless connection with the external apparatus after the instruction is no longer being accepted.

17. A non-transitory computer-readable storage medium storing a program that, when executed by a processor of a communication apparatus including a communication unit that wirelessly communicates with an external apparatus and an instruction accepting unit that accepts an instruction of an operation for the external apparatus to execute, and causing an external apparatus to operate through a remote control, causes the processor to perform operations comprising:
establishing a wireless connection with the external apparatus upon the instruction accepting unit accepting the instruction;
transmitting an operation command corresponding to the instruction to the external apparatus; and
disconnecting the wireless connection with the external apparatus upon the external apparatus executing part of a series of operations corresponding to the operation command, without waiting for the remaining operations to be executed,
further comprising:
in the case where the operation executed by the external apparatus is a shooting operation and the instruction accepting unit continuously accepts an instruction for the shooting operation, maintaining the wireless connection with the external apparatus even after the external apparatus has executed part of the operations corresponding to the operation command; and in the case where, after the instruction accepting unit has continuously accepted the instruction for the shooting operation, the instruction accepting unit no longer accepts the instruction, disconnecting the wireless connection with the external apparatus after the instruction is no longer being accepted.

* * * * *